(12) United States Patent
Miyakoshi et al.

(10) Patent No.: US 11,192,428 B2
(45) Date of Patent: Dec. 7, 2021

(54) VEHICLE AIR-CONDITIONING DEVICE

(71) Applicant: SANDEN AUTOMOTIVE CLIMATE SYSTEMS CORPORATION, Isesaki (JP)

(72) Inventors: Ryo Miyakoshi, Isesaki (JP); Megumi Shigeta, Isesaki (JP); Osamu Takazawa, Isesaki (JP); Kohei Yamashita, Isesaki (JP)

(73) Assignee: Sanden Automotive Climate Systems Corporation, Isesaki (JP)

( * ) Notice: Subject to any disclaimer, the term of this patent is extended or adjusted under 35 U.S.C. 154(b) by 118 days.

(21) Appl. No.: 16/614,188

(22) PCT Filed: Apr. 23, 2018

(86) PCT No.: PCT/JP2018/017359
§ 371 (c)(1),
(2) Date: Nov. 15, 2019

(87) PCT Pub. No.: WO2018/211958
PCT Pub. Date: Nov. 22, 2018

(65) Prior Publication Data
US 2021/0094391 A1    Apr. 1, 2021

(30) Foreign Application Priority Data
May 18, 2017 (JP) .............................. JP2017-098907

(51) Int. Cl.
*B60H 1/32* (2006.01)
*B60H 1/00* (2006.01)
*B60H 1/03* (2006.01)

(52) U.S. Cl.
CPC ....... *B60H 1/3205* (2013.01); *B60H 1/00485* (2013.01); *B60H 1/034* (2013.01);
(Continued)

(58) Field of Classification Search
CPC .. B60H 1/3205; B60H 1/00485; B60H 1/034; B60H 2001/3254; B60H 2001/3267; F25B 2600/2519
See application file for complete search history.

(56) References Cited

U.S. PATENT DOCUMENTS 5,291,941 A * 3/1994 Enomoto ........... B60H 1/00007
165/62
10,240,835 B2 * 3/2019 Ohta ....................... F16K 15/00
(Continued)

FOREIGN PATENT DOCUMENTS

EP    2 727 754 A1    5/2014
JP    H04-113860 U   10/1992
(Continued)

OTHER PUBLICATIONS

Japan Patent Office, International Search Report issued in International Application No. PCT/JP2018/017359, dated Jul. 31, 2018.

*Primary Examiner* — Marc E Norman
(74) *Attorney, Agent, or Firm* — Baker Botts L.L.P.

(57) ABSTRACT

A vehicle air-conditioning device is provided which is capable of eliminating or suppressing vibration and noise generated due to the application of a counterpressure to an opening/closing valve. The vehicle air-conditioning device includes a refrigerant circuit R having a compressor 2, a radiator 4 to perform heat exchange between a refrigerant and air, an outdoor heat exchanger 7, a heat absorber 9, and a solenoid valve 40. The compressor 2 and the solenoid valve 40 are controlled to air-condition a vehicle interior. A decompression speed at a refrigerant inflow side of the solenoid valve when the compressor 2 is stopped and the solenoid valve 40 is closed is faster than that at a refrigerant outflow side thereof. When operation is stopped from a state in which the compressor 2 is operating with the solenoid (Continued)

valve 40 being in an opened state, the opened state of the solenoid valve 40 is maintained even after the compressor 2 is stopped.

18 Claims, 8 Drawing Sheets

(52) U.S. Cl.
CPC ................ *B60H 2001/3254* (2013.01); *B60H 2001/3267* (2013.01)

(56) References Cited

U.S. PATENT DOCUMENTS

| | | | |
|---|---|---|---|
| 2015/0260439 A1 | 9/2015 | Ohta | |
| 2017/0210202 A1 | 7/2017 | Suzuki et al. | |
| 2019/0047362 A1* | 2/2019 | Suzuki | B60H 1/00907 |
| 2019/0077223 A1* | 3/2019 | Ishizeki | B60H 1/32 |

FOREIGN PATENT DOCUMENTS

| | | |
|---|---|---|
| JP | H05-019572 U | 3/1993 |
| JP | H05-223357 A | 8/1993 |
| JP | H10-196838 A | 7/1998 |
| JP | 2001-227670 A | 8/2001 |
| JP | 2003-291624 A | 10/2003 |
| JP | 2005-337654 A | 12/2005 |
| JP | 2006-069332 A | 3/2006 |
| JP | 2013-023210 A | 2/2013 |
| JP | 2014-074516 A | 4/2014 |
| JP | 2014-088154 A | 5/2014 |
| WO | 2015/182219 A1 | 12/2015 |

\* cited by examiner

VEHICLE AIR-CONDITIONING DEVICE

CROSS-REFERENCE TO RELATED APPLICATIONS

This application is a U.S. National Stage Patent Application under 35 U.S.C. § 371 of International Patent Application No. PCT/JP2018/017359, filed on Apr. 23, 2018, which claims the benefit of Japanese Patent Application No. 2017-098907, filed on May 18, 2017, the disclosures of each of which are incorporated herein by reference in their entirety.

TECHNICAL FIELD

The present invention relates to a vehicle air-conditioning device of a heat pump system which conditions air of a vehicle interior.

BACKGROUND ART

Due to actualization of environmental problems in recent years, hybrid cars and electric vehicles have spread. Then, as an air conditioning device which is applicable to such a vehicle, there has been developed one which includes a compressor to compress and discharge a refrigerant, an internal condenser provided within a vehicle interior to let the refrigerant radiate heat, an evaporator provided within the vehicle interior to let the refrigerant absorb heat, an external condenser provided outside the vehicle interior to let the refrigerant radiate or absorb heat, a first expansion valve to expand the refrigerant flowing into the external condenser, a second expansion valve to expand the refrigerant flowing into the evaporator, a pipe to bypass the internal condenser and the first expansion valve, and a first valve to change whether the refrigerant discharged from the compressor is made to flow into the internal condenser or the refrigerant is made to directly flow from the pipe to the external condenser by bypassing the internal condenser and the first expansion valve, and which changes and executes a heating mode to let the refrigerant discharged from the compressor flow into the internal condenser by the first valve and radiate heat, decompress the heat-radiated refrigerant in the first expansion valve, and then let the refrigerant absorb heat in the external condenser, a dehumidifying mode to let the refrigerant discharged from the compressor radiate heat in the internal condenser by the first valve, decompress the heat-radiated refrigerant in the second expansion valve, and the let the refrigerant absorb heat in the evaporator, and a cooling mode to let the refrigerant discharged from the compressor flow into the external condenser and radiate heat by bypassing the internal condenser and the first expansion valve by the first valve, decompress the refrigerant in the second expansion valve, and then let the refrigerant absorb heat in the evaporator (refer to, for example, Patent Document 1).

CITATION LIST

Patent Documents

Patent Document 1: Japanese Patent Application Publication No. 2013-23210
Patent Document 2: Japanese Patent Application Publication No. Hei 10-196838
Patent Document 3: Japanese Patent Application Publication No. 2001-227670

SUMMARY OF THE INVENTION

Problems to be Solved by the Invention

Here, in the case where the first valve of Patent Document 1 described above is constituted of two solenoid valves provided in respective refrigerant pipes branching from the discharge side of the compressor, when each solenoid valve is closed when the compressor is stopped, a region surrounded by the discharge side of the compressor and each solenoid valve becomes a closed state, Since at this time, the discharge side of the compressor becomes the highest pressure within a refrigerant circuit, the pressure on the refrigerant inflow side in each solenoid valve, and the refrigerant outflow side becomes a low barotropic state.

On the other hand, since there is normally provided in the compressor, a structure of equalizing in pressure between a refrigerant discharge side and a refrigerant suction side, a decompression speed at the refrigerant inflow side becomes faster than that at the refrigerant outflow side in each solenoid valve after the stop of the compressor. There is therefore a danger that a pressure reversal in which the pressure at the refrigerant inflow side of the solenoid valve becomes lower than that at the refrigerant outflow side will occur.

When the counterpressure (the pressure at the refrigerant outflow side being higher than that at the refrigerant inflow side) is applied to the solenoid valve for such a reason, an internal valve body is pushed up by the pressure at the refrigerant outflow side and opened. Further, a problem arises in that since the valve body is then closed again by the biasing force of a coil spring, such opening/closing is finely performed to generate vibration and noise.

In particular, in the case where there are adopted a pilot type solenoid valve to operate a main valve body by utilizing a pressure difference between a refrigerant inflow side and a refrigerant outflow side, e.g., a so-called normally closed pilot type solenoid valve opened upon energization such as shown in Patent Document 2, and a so-called normally opened pilot type solenoid valve opened upon non-energization such as shown in Patent Document 3, the balance for maintaining the opening/closing state of the main valve body is easy to collapse with the reversal of pressure between the refrigerant inflow side and the refrigerant outflow side, for which its improvement has been desired.

The present invention has been developed to solve such conventional technical problems, and an object thereof is to provide a vehicle air-conditioning device capable of eliminating or suppressing vibration and noise generated due to the application of a counterpressure to an opening/closing value.

Means for Solving the Problems

A vehicle air-conditioning device of the invention of claim 1 includes a refrigerant circuit having a compressor to compress a refrigerant, a heat exchanger to perform heat exchange between the refrigerant and air, and an opening/closing valve to change a flow passage of the refrigerant, and is characterized in that a control device controls the compressor and the opening/closing valve to condition the air of a vehicle interior, and a decompression speed at a refrigerant inflow side of the opening/closing valve when the compressor is stopped and the opening/closing valve is closed is faster than a decompression speed at a refrigerant outflow side of the opening/closing valve, and in that when operation is stopped from a state in which the compressor is operating in an opened state of the opening/closing valve, the control device maintains the opened state of the opening/closing valve even after the compressor is stopped.

A vehicle air-conditioning device of the invention of claim 2 includes a compressor to compress a refrigerant, a radiator to let the refrigerant radiate heat, thereby heating air to be supplied to a vehicle interior, a first opening/closing valve provided between a discharge side of the compressor and an inlet side of the radiator, a bypass pipe to branch on an upstream side of the first opening/closing valve, thereby bypassing the radiator, a second opening/closing valve provided in the bypass pipe, and a control device, and is characterized in that the control device executes at least an operation mode to close the first opening/closing valve and open the second opening/closing valve to thereby let the refrigerant discharged from the compressor flow into the bypass pipe, and during stopping of operation, the first opening/closing valve is opened and the second opening/closing valve is closed, and in that when the operation is stopped from a state in which the compressor is operating in the operation mode, the control device maintains the first opening/closing valve in a closed state and the second opening/closing valve in an opened state even after the compressor is stopped.

A vehicle air-conditioning device of the invention of claim 3 includes a compressor to compress a refrigerant, an air flow passage through which air to be supplied to a vehicle interior flows, a radiator to let the refrigerant radiate heat, thereby heating the air to be supplied from the air flow passage to the vehicle interior, a heat absorber to let the refrigerant absorb heat, thereby cooling the air to be supplied from the air flow passage to the vehicle interior, an outdoor heat exchanger provided outside the vehicle interior, an outdoor expansion valve to decompress the refrigerant flowing out from the radiator and flowing into the outdoor heat exchanger, a first opening/closing valve provided between a discharge side of the compressor and an inlet side of the radiator, a bypass pipe to branch on an upstream side of the first opening/closing valve to bypass the radiator and the outdoor expansion valve, thereby letting the refrigerant discharged from the compressor flow into the outdoor heat exchanger, a second opening/closing valve provided in the bypass pipe, and a control device, and is characterized in that the control device executes at least an operation mode to fully close the outdoor expansion valve, close the first opening/closing valve, and open the second opening/closing valve to thereby let the refrigerant discharged from the compressor flow into the outdoor heat exchanger by the bypass pipe and radiate heat, decompress the refrigerant from which the heat has been radiated, and then let the refrigerant absorb heat in the heat absorber, and during stopping of operation, the first opening/closing valve is opened and the second opening/closing valve is closed, and in that when the operation is stopped from a state in which the compressor is operating in the operation mode, the control device maintains the first opening/closing valve in a closed state and the second opening/closing valve in an opened state even after the compressor is stopped.

The vehicle air-conditioning device of the invention of claim 4 is characterized in that in the above invention, when the operation is stopped from the state in which the compressor is operating in the operation mode, the control device stops the compressor and opens the outdoor expansion valve.

The vehicle air-conditioning device of the invention of claim 5 is characterized in that in the above invention, when a valve position of the outdoor expansion valve is enlarged to a predetermined valve position, the control device opens the first opening/closing valve and closes the second opening/closing valve.

The vehicle air-conditioning device of the invention of claim 6 is characterized in that in the invention of claim 4 or 5, when the outdoor expansion valve is fully opened, the control device opens the first opening/closing valve and closes the second opening/closing valve.

The vehicle air-conditioning device of the invention of claim 7 is characterized in that in the inventions of claims 3 to 6, when a pressure difference in before and after the first opening/closing valve is reduced to a predetermined value after the compressor is stopped, the control device opens the first opening/closing valve and closes the second opening/closing valve.

The vehicle air-conditioning device of the invention of claim 8 is characterized in that in the inventions of claims 5 to 7, the control device closes the second opening/closing valve after the first opening/closing valve is opened.

The vehicle air-conditioning device of the invention of claim 9 is characterized in that in the inventions of claims 3 to 8, the first opening/closing valve is a solenoid valve closed in an energization state and opened in a non-energization state, and the second opening/closing valve is a solenoid valve opened in an energization state and closed in a non-energization state, and in that when the operation is stopped from the state in which the compressor is operating in the operation mode, the control device is supplied with power even after the compressor is stopped, to maintain the first opening/closing valve and the second opening/closing valve in an energized state. The control device is shut off from the power supply after the valve position of the outdoor expansion valve is enlarged to the predetermined valve position or fully opened, or the pressure difference in before and after the first opening/closing valve is reduced to the predetermined value, to make the first opening/closing valve non-energized and also make the second opening/closing valve non-energized.

The vehicle air-conditioning device of the invention of claim 10 is characterized in that in the inventions of claims 3 to 9, the operation mode is a maximum cooling mode to fully close the outdoor expansion valve, close the first opening/closing valve, and open the second opening/closing valve to let the refrigerant discharged from the compressor flow into the outdoor heat exchanger by the bypass pipe and radiate heat, decompress the refrigerant from which the heat has been radiated, and then let the refrigerant absorb heat in the heat absorber.

The vehicle air-conditioning device of the invention of claim 11 is characterized in the inventions of claims 3 to 10 by including an auxiliary heating device provided in the air flow passage, and in that the operation mode is a dehumidifying and heating mode to fully close the outdoor expansion valve, close the first opening/closing valve, and open the second opening/closing valve to let the refrigerant discharged from the compressor flow into the outdoor heat exchanger by the bypass pipe and radiate heat, decompress the refrigerant from which the heat has been radiated, and then let the refrigerant absorb heat in the heat absorber and let the auxiliary heating device generate heat.

The vehicle air-conditioning device of the invention of claim 12 is characterized in that in the respective inventions, the opening/closing valve is a pilot type solenoid valve to operate a valve body by using a difference in pressure between the refrigerant inflow side and the refrigerant outflow side.

Advantageous Effect of the Invention

According to the present invention of claim 1, in a vehicle air-conditioning device including a refrigerant circuit having a compressor to compress a refrigerant, a heat exchanger to perform heat exchange between the refrigerant and air, and an opening/closing valve to change a flow passage of the refrigerant, and in which a control device controls the compressor and the opening/closing valve to condition the air of a vehicle interior, and a decompression speed at a refrigerant inflow side of the opening/closing valve when the compressor is stopped and the opening/closing valve is closed is faster than a decompression speed at a refrigerant outflow side of the opening/closing valve, when operation is stopped from a state in which the compressor is operating in an opened state of the opening/closing valve, the control device maintains the opened state of the opening/closing valve even after the compressor is stopped. It is therefore possible to eliminate application of a counterpressure to the opening/closing valve because when the compressor is stopped and the opening/closing valve is closed, the decompression speed at the refrigerant inflow side of the opening/closing valve is faster than that at the refrigerant outflow side.

Also, according to the invention of claim 2, in a vehicle air-conditioning device which includes a compressor to compress a refrigerant, a radiator to let the refrigerant radiate heat, thereby heating air to be supplied to a vehicle interior, a first opening/closing valve provided between a discharge side of the compressor and an inlet side of the radiator, a bypass pipe to branch on an upstream side of the first opening/closing valve, thereby bypassing the radiator, a second opening/closing valve provided in the bypass pipe, and a control device, and in which the control device executes at least an operation mode to close the first opening/closing valve and open the second opening/closing valve to thereby let the refrigerant discharged from the compressor flow into the bypass pipe, and during stopping of operation, the first opening/closing valve is opened and the second opening/closing valve is closed, when the operation is stopped from a state in which the compressor is operating in the operation mode, the control device maintains the first opening/closing valve in a closed state and the second opening/closing valve in an opened state even after the compressor is stopped. Therefore, when the operation is stopped from the state in which the operation mode to close the first opening/closing valve and open the second opening/closing valve to let the refrigerant discharged from the compressor flow into the bypass pipe is executing, a region surrounded by the discharge side of the compressor and the first opening/closing valve and the second opening/closing valve becomes a closed state, and a decompression speed at a refrigerant inflow side of each subsequent opening/closing device is faster than that at a refrigerant outflow side, whereby application of a counterpressure to each opening/closing valve can be eliminated.

Further, according to the invention of claim 3, in a vehicle air-conditioning device which includes a compressor to compress a refrigerant, an air flow passage through which air to be supplied to a vehicle interior flows, a radiator to let the refrigerant radiate heat, thereby heating the air to be supplied from the air flow passage to the vehicle interior, a heat absorber to let the refrigerant absorb heat, thereby cooling the air to be supplied from the air flow passage to the vehicle interior, an outdoor heat exchanger provided outside the vehicle interior, an outdoor expansion valve to decompress the refrigerant flowing out from the radiator and flowing into the outdoor heat exchanger, a first opening/closing valve provided between a discharge side of the compressor and an inlet side of the radiator, a bypass pipe to branch on an upstream side of the first opening/closing valve to bypass the radiator and the outdoor expansion valve, thereby letting the refrigerant discharged from the compressor flow into the outdoor heat exchanger, a second opening/closing valve provided in the bypass pipe, and a control device, and in which the control device executes at least an operation mode to fully close the outdoor expansion valve, close the first opening/closing valve, and open the second opening/closing valve to thereby let the refrigerant discharged from the compressor flow into the outdoor heat exchanger by the bypass pipe and radiate heat, decompress the refrigerant from which the heat has been radiated, and then let the refrigerant absorb heat in the heat absorber, and during stopping of operation, the first opening/closing valve is opened and the second opening/closing valve is closed, when the operation is stopped from a state in which the compressor is operating in the operation mode, the control device maintains the first opening/closing valve in a closed state and the second opening/closing valve in an opened state even after the compressor is stopped. Therefore, when the operation is stopped from the state in which the compressor is operating in the maximum cooling mode of the invention of claim 10 or the dehumidifying and heating mode of the invention of claim 11, a region surrounded by the discharge side of the compressor and the first opening/closing valve and the second opening/closing valve becomes a closed state, and a decompression speed at a refrigerant inflow side of each subsequent opening/closing valve is faster than that at a refrigerant outflow side thereof, whereby it is possible to eliminate application of a counterpressure to each solenoid valve.

According to the inventions of claims 1 to 3, these are capable of eliminating or suppressing vibration and noise generated due to the application of the counterpressure to each opening/closing valve. This is particularly effective where as in the invention of claim 12, the opening/closing valve is constituted of a pilot type solenoid valve which operates a valve body by utilizing a difference in pressure between the refrigerant inflow side and the refrigerant outflow side.

Also, according to the invention of claim 4, in the invention of claim 3, since the compressor is stopped and the outdoor expansion valve is opened when stopping the operation from the state in which the compressor is operating in the operation mode, the control device can release the pressure on the discharge side of the compressor to the radiator side through the outdoor expansion valve after the stop of the compressor and rapidly equalize in pressure between the refrigerant inflow side of the first opening/closing valve and its refrigerant outflow side.

Then, as in the invention of claim 5, if the control device opens the first opening/closing valve and closes the second opening/closing valve where the valve position of the outdoor expansion valve is enlarged to the predetermined valve position or the outdoor expansion valve is fully opened as in the invention of claim 6, it is possible to reliably eliminate or suppress vibration and noise generated due to the application of a counterpressure to each opening/closing valve.

Additionally, as in the invention of claim 7, even when the control device opens the first opening/closing valve and closes the second opening/closing valve after the compressor is stopped, where the pressure difference in before and after the first opening/closing valve is reduced to the predetermined value, it is possible to appropriately eliminate or suppress vibration and noise generated due to the application of the counterpressure to each opening/closing valve.

In this case, as in the invention of claim 8, if the control device closes the second opening/closing valve after the first opening/closing valve is opened, it is possible to reliably prevent a region surrounded by the discharge side of the compressor and each opening/closing valve from becoming a closed state.

Further, as in the invention of claim 9, the inventions of claims 3 to 8 are effective where the first opening/closing valve is a solenoid valve closed in an energization state and opened in a non-energization state, and the second opening/closing valve is a solenoid valve opened in an energization state and closed in a non-energization state. When the operation is stopped from the state in which the compressor is operating in the operation mode, the control device is supplied with power even after the compressor is stopped, to maintain the first opening/closing valve and the second opening/closing valve in an energized state. The control device is shut off from the power supply after the valve position of the outdoor expansion valve is enlarged to the predetermined valve position or fully opened, or the pressure difference in before and after the first opening/closing valve is reduced to the predetermined value, to make the first opening/closing valve non-energized and also make the second opening/closing valve non-energized. Consequently, it is possible to stop the supply of power to the control device and also the energization to the first and second opening/closing valves at an early time while appropriately eliminating or reducing noise.

MODE FOR CARRYING OUT THE INVENTION

Hereinafter, description will be made as to embodiments of the present invention in detail with reference to the drawings.

Embodiment 1

Figure 1:
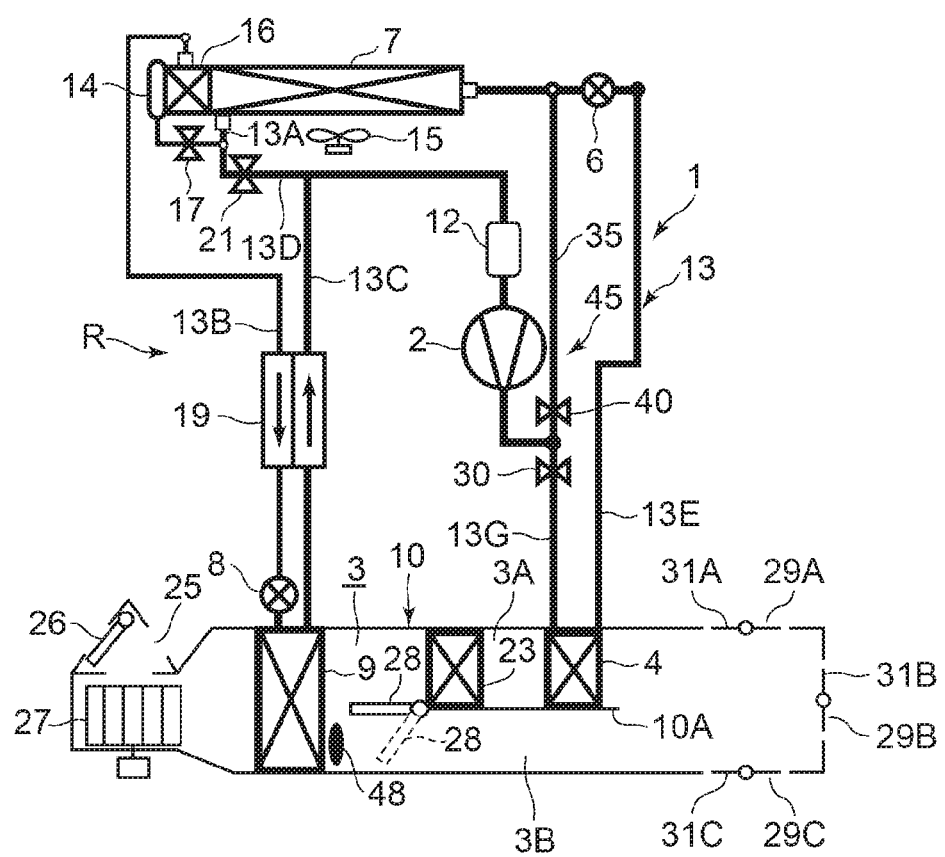
FIG. 1 is a constitutional view of a vehicle air-conditioning device of an embodiment to which the present invention is applied (Embodiment 1)

FIG. 1 shows a constitutional view of a vehicle air-conditioning device 1 of an embodiment of the present invention. A vehicle of the embodiment to which the present invention is applied is an electric vehicle (EV) in which an engine (an internal combustion engine) is not mounted, and runs with an electric motor for running which is driven by power charged in a battery (both being not shown in the drawing), and the vehicle air-conditioning device 1 of the present invention is also driven by the power of the battery.

That is, in the electric vehicle which is not capable of performing heating by engine waste heat, the vehicle air-conditioning device 1 of the embodiment performs a heating mode by a heat pump operation in which a refrigerant circuit is used. Further, the vehicle air-conditioning device 1 selectively changes and executes respective operation modes of a dehumidifying and heating mode, a dehumidifying and cooling mode, a cooling mode, a MAX cooling mode (maximum cooling mode), and an auxiliary heater single mode.

Incidentally, the vehicle is not limited to the electric vehicle, and the present invention is also effective for a so-called hybrid car in which the engine is used together with the electric motor for running. Further, it is needless to say that the present invention is also applicable to a usual car which runs with the engine.

The vehicle air-conditioning device 1 of the embodiment performs air conditioning (heating, cooling, dehumidifying, and ventilation) of a vehicle interior of the electric vehicle. An electric type of compressor 2 to compress a refrigerant, a radiator 4 provided in an air flow passage 3 of an HVAC unit 10 in which vehicle interior air is ventilated and circulated, to let the high-temperature high-pressure refrigerant discharged from the compressor 2 flow therein via a refrigerant pipe 13G and to let the refrigerant radiate heat to heat air supplied to the vehicle interior (heat exchanger to perform heat exchange between the refrigerant and air), an outdoor expansion valve 6 (a pressure reducing unit) constituted of an electric valve which decompresses and expands the refrigerant during the heating, an outdoor heat exchanger 7 which is provided outside the vehicle interior and which performs heat exchange between the refrigerant and outdoor air to function as the radiator during the cooling and to function as an evaporator during the heating (this is also a heat exchanger to perform heat exchange between the refrigerant and the air), an indoor expansion valve 8 (a pressure reducing unit) constituted of an electric valve to decompress and expand the refrigerant, a heat absorber 9 provided in the air flow passage 3 to let the refrigerant absorb heat during the cooling and dehumidifying to cool air sucked from interior and exterior of the vehicle and supplied to the vehicle interior (this is also heat exchanger to perform heat exchange between the refrigerant and the air), an accumulator 12, and others are successively connected by a refrigerant pipe 13, whereby a refrigerant circuit R is constituted.

Then, the refrigerant circuit R is filled with a predetermined amount of refrigerant and oil for lubrication. Incidentally, an outdoor blower 15 is provided in the outdoor heat exchanger 7. The outdoor blower 15 forcibly passes the outdoor air through the outdoor heat exchanger 7 to thereby perform the heat exchange between the outdoor air and the refrigerant, whereby the outdoor air is made to pass through the outdoor heat exchanger 7 even during stopping of the vehicle (i.e., its velocity is 0 km/h).

Further, the outdoor heat exchanger 7 has a receiver drier portion 14 and a subcooling portion 16 successively on a refrigerant downstream side. A refrigerant pipe 13A extending out from the outdoor heat exchanger 7 is connected to the receiver drier portion 14 via a solenoid valve 17 to be opened during the cooling. A refrigerant pipe 13B on an outlet side of the subcooling portion 16 is connected to an inlet side of the heat absorber 9 via the indoor expansion valve 8. Incidentally, the receiver drier portion 14 and the subcooling portion 16 structurally constitute a part of the outdoor heat exchanger 7.

Additionally, a refrigerant pipe 13B between the subcooling portion 16 and the indoor expansion valve 8 is provided in a heat exchange relation with a refrigerant pipe 13C on an outlet side of the heat absorber 9, and both the pipes constitute an internal heat exchanger 19. Consequently, the refrigerant flowing into the indoor expansion valve 8 through the refrigerant pipe 13B is made to be cooled (subcooled) by the low-temperature refrigerant flowing out from the heat absorber 9.

In addition, the refrigerant pipe 13A extending out from the outdoor heat exchanger 7 branches to a refrigerant pipe 13D, and this branching refrigerant pipe 13D communicates and connects with the refrigerant pipe 13C on a downstream side of the internal heat exchanger 19 via a solenoid valve 21 to be opened during the heating. The refrigerant pipe 13C is connected to the accumulator 12, and the accumulator 12 is connected to a refrigerant suction side of the compressor 2. Further, a refrigerant pipe 13E on an outlet side of the radiator 4 is connected to an inlet side of the outdoor heat exchanger 7 via the outdoor expansion valve 6.

Furthermore, a solenoid valve 30 (a first opening/closing valve of the present invention for changing a refrigerant flow passage) to be closed during dehumidifying and heating and MAX cooling to be described later is interposed in the refrigerant pipe 13G between a discharge side of the compressor 2 and an inlet side of the radiator 4. In this case, the refrigerant pipe 13G branches to a bypass pipe 35 on an upstream side of the solenoid valve 30. This bypass pipe 35 communicates and connects with the refrigerant pipe 13E on a downstream side of the outdoor expansion valve 6 via a solenoid valve 40 (an opening/closing valve, a second opening/closing valve of the present invention for changing a refrigerant flow passage) to be opened during the dehumidifying and heating and the MAX cooling. A bypass device 45 is constituted of these bypass pipe 35, solenoid valve 30 and solenoid valve 40.

The bypass device 45 is constituted of such a bypass pipe 35, a solenoid valve 30 and a solenoid valve 40 to thereby make it possible to smoothly perform changing of the dehumidifying and heating mode and the MAX cooling mode to allow the refrigerant discharged from the compressor 2 to directly flow in the outdoor heat exchanger 7, and the heating mode, the dehumidifying and cooling mode, and the cooling mode to allow the refrigerant discharged from the compressor 2 to flow in the radiator 4, as will be described later.

Additionally, in the air flow passage 3 on an air upstream side of the heat absorber 9, respective suction ports such as an outdoor air suction port and an indoor air suction port are formed (shown as a representative by a suction port 25 in FIG. 1). There is provided in the suction port 25, a suction changing damper 26 to change the air to be introduced into the air flow passage 3 to indoor air which is air of the vehicle interior (an indoor air circulating mode) and outdoor air which is air outside the vehicle interior (an outdoor air introducing mode). Furthermore, on an air downstream side of the suction changing damper 26, an indoor blower (a blower fan) 27 for supplying the introduced indoor or outdoor air to the air flow passage 3 is provided.

Furthermore, in FIG. 1, 23 denotes an auxiliary heater as an auxiliary heating device provided in the vehicle air-conditioning device 1 of the embodiment. The auxiliary heater 23 of the embodiment is constituted of a PTC heater being an electric heater, and provided in the air flow passage 3 on a windward side (an air upstream side) of the radiator 4 to the flow of the air in the air flow passage 3. Then, when the auxiliary heater 23 is energized to generate heat, the air in the air flow passage 3, which flows into the radiator 4 via the heat absorber 9 is heated. That is, the auxiliary heater 23 becomes a so-called heater core to perform heating of the vehicle interior or complement it.

Here, the air flow passage 3 on a leeward side (an air downstream side) more than the heat absorber 9 of the HVAC unit 10 is partitioned by a partition wall 10A to form a heating heat exchange passage 3A and a bypass passage 3B to bypass it. The aforementioned radiator 4 and auxiliary heater 23 are disposed in the heating heat exchange passage 3A.

Additionally, in the air flow passage 3 on a windward side of the auxiliary heater 23, there is provided an air mix damper 28 to adjust a ratio at which the air (the indoor air or outdoor air) in the air flow passage 3 flowing into the air flow passage 3 and passed through the heat absorber 9 is to be passed through the heating heat exchange passage 3A in which the auxiliary heater 23 and the radiator 4 are disposed.

Furthermore, the HVAC unit 10 on a leeward side of the radiator 4 is formed with respective outlets of a FOOT (foot) outlet 29A (first outlet), a VENT (vent) outlet 29B (a second outlet with respect to the FOOT outlet 29A and a first outlet with respect to a DEF outlet 29C), and the DEF (def) outlet 29C (a second outlet). The FOOT outlet 29A is an outlet to blow out the air to the foot of the vehicle interior and is located at the lowest position. Further, the VENT outlet 29B is an outlet to blow out the air to the proximity of the breast or face of a driver in the vehicle interior, and is located above the FOOT outlet 29A. Then, the DEF outlet 29C is an outlet to blow out the air to an inner surface of a front glass of the vehicle, and is located at the highest position above other outlets 29A and 29B.

Then, the FOOT outlet 29A, the VENT outlet 29B, and the DEF outlet 29C are respectively provided with a FOOT outlet damper 31A, a VENT outlet damper 31B, and a DEF outlet damper 31C to control a blow-out amount of the air.

Figure 2:
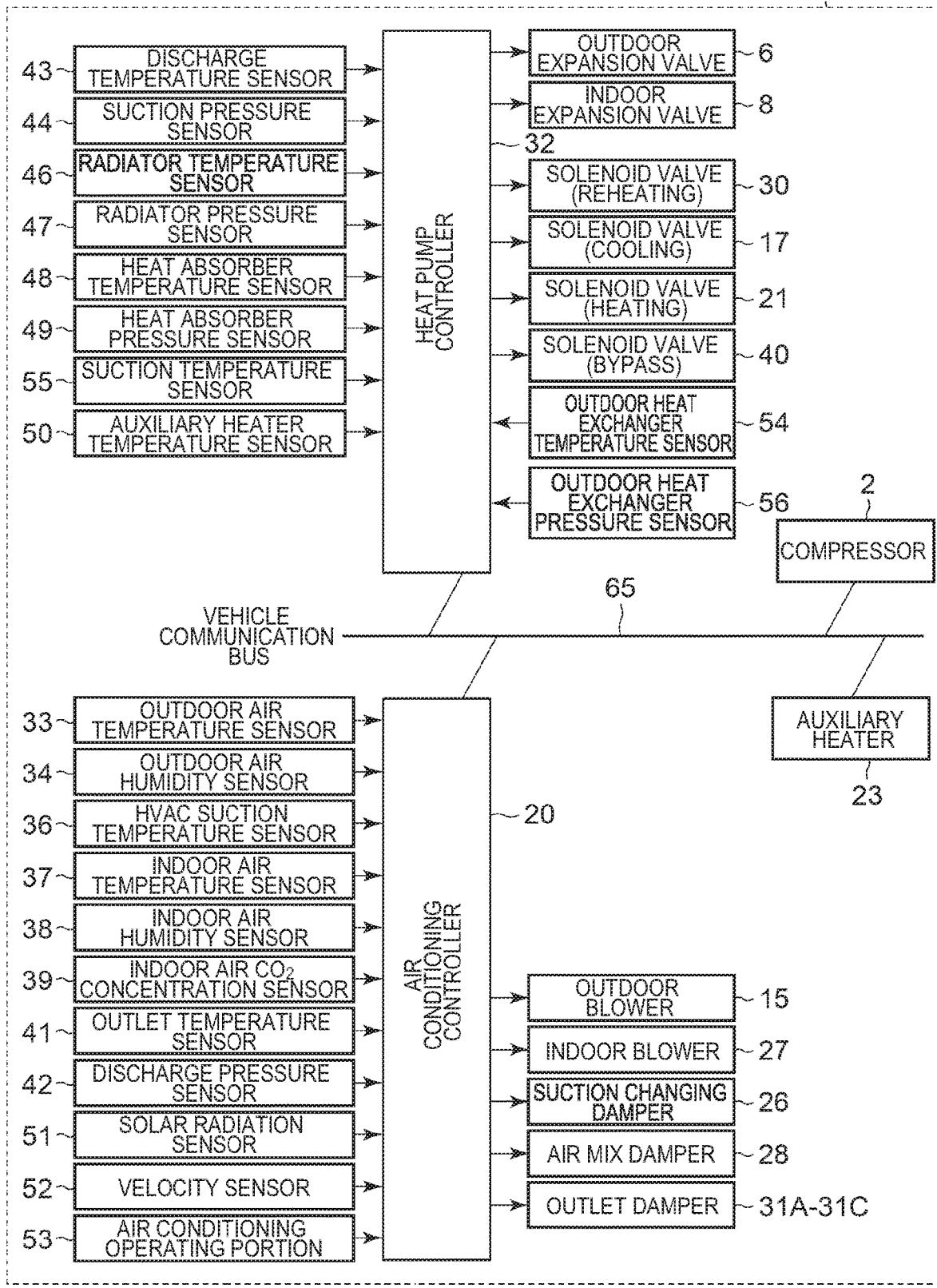
FIG. 2 is a block diagram of a control device of the vehicle air-conditioning device of FIG. 1.

Next, FIG. 2 shows a block diagram of a control device 11 of the vehicle air-conditioning device 1 of the embodiment. The control device 11 is constituted of an air conditioning controller 20 and a heat pump controller 32 both constituted of a microcomputer as an example of a computer having a processor. These are connected to a vehicle communication bus 65 which constitutes a CAN (Controller Area Network) or a LIN (Local Interconnect Network). Further, the compressor 2 and the auxiliary heater 23 are also connected to the vehicle communication bus 65. These air conditioning controller 20, heat pump controller 32, compressor 2 and auxiliary heater 23 are constituted to perform transmission and reception of data through the vehicle communication bus 65.

The air conditioning controller 20 is a high-order controller which performs control of vehicle interior air conditioning of the vehicle. An input of the air conditioning controller 20 is connected with respective outputs of an outdoor air temperature sensor 33 which detects an outdoor air temperature Tam of the vehicle, an outdoor air humidity sensor 34 which detects an outdoor air humidity, an HVAC suction temperature sensor 36 which detects a temperature (a suction air temperature Tas) of the air to be sucked from the suction port 25 to the air flow passage 3 and flow into the heat absorber 9, an indoor air temperature sensor 37 which detects a temperature (an indoor temperature Tin) of the air (the indoor air) of the vehicle interior, an indoor air humidity sensor 38 which detects a humidity of the air of the vehicle interior, an indoor air $CO_2$ concentration sensor 39 which detects a carbon dioxide concentration of the vehicle interior, an outlet temperature sensor 41 which detects a temperature of the air to be blown out to the vehicle interior, a discharge pressure sensor 42 which detects a discharge refrigerant pressure Pd of the compressor 2, a solar radiation sensor 51 of, e.g., a photo sensor system to detect a solar radiation amount into the vehicle interior, and a velocity sensor 52 to detect a moving speed (a velocity) of the vehicle, and an air conditioning (aircon) operating portion 53 to set the changing of a predetermined temperature or the operation mode.

Further, an output of the air conditioning controller 20 is connected with the outdoor blower 15, the indoor blower (the blower fan) 27, the suction changing damper 26, the air mix damper 28, and the respective outlet dampers 31A through 31C, and they are controlled by the air conditioning controller 20.

The heat pump controller 32 is a controller which mainly performs control of the refrigerant circuit R. An input of the heat pump controller 32 is connected with respective outputs of a discharge temperature sensor 43 which detects a temperature Td of the refrigerant discharged from the compressor 2, a suction pressure sensor 44 which detects a pressure Ps of the refrigerant to be sucked into the compressor 2, a suction temperature sensor 55 which detects a temperature Ts of the refrigerant to be sucked into the compressor 2, a radiator temperature sensor 46 which detects a refrigerant temperature (a radiator temperature TCI) of the radiator 4, a radiator pressure sensor 47 which detects a refrigerant pressure (a radiator pressure PCI) of the radiator 4, a heat absorber temperature sensor 48 which detects a refrigerant temperature (a heat absorber temperature Te) of the heat absorber 9, a heat absorber pressure sensor 49 which detects a refrigerant pressure of the heat absorber 9, an auxiliary heater temperature sensor 50 which detects a temperature (an auxiliary heater temperature Tptc) of the auxiliary heater 23, an outdoor heat exchanger temperature sensor 54 which detects a refrigerant temperature (an outdoor heat exchanger temperature TXO) of an outlet of the outdoor heat exchanger 7, and an outdoor heat exchanger pressure sensor 56 which detects a refrigerant pressure (an outdoor heat exchanger pressure PXO) of the outlet of the outdoor heat exchanger 7.

Further, an output of the heat pump controller 32 is connected with respective solenoid valves of the outdoor expansion valve 6, the indoor expansion valve 8, the solenoid valve 30 (for the reheating), the solenoid valve 17 (for the cooling), the solenoid valve 21 (for the heating), and the solenoid valve 40 (for the bypass), and they are controlled by the heat pump controller 32. Incidentally, the compressor 2 and the auxiliary heater 23 respectively have controllers incorporated therein, and the controllers of the compressor 2 and the auxiliary heater 23 perform transmission and reception of data to and from the heat pump controller 32 via the vehicle communication bus 65 and are controlled by the heat pump controller 32.

The heat pump controller 32 and the air conditioning controller 20 mutually perform transmission and reception of the data via the vehicle communication bus 65 and control respective devices on the basis of the outputs of the respective sensors and the setting input by the air conditioning operating portion 53. However, in the embodiment in this case, a volumetric air volume Ga (calculated by the air conditioning controller 20) of the air flowing into the outdoor air temperature sensor 33, the discharge pressure sensor 42, the velocity sensor 52, and the air flow passage 3, an air volume ratio SW (calculated by the air conditioning controller 20) by the air mix damper 28, and the output of the air conditioning operating portion 53 are transmitted from the air conditioning controller 20 to the heat pump controller 32 through the vehicle communication bus 65 and adapted to be supplied for control by the heat pump controller 32.

With the above constitution, an operation of the vehicle air-conditioning device 1 of the embodiment will next be described. In this embodiment, the control device 11 (the air conditioning controller 20 and the heat pump controller 32) changes and executes the respective operation modes of the heating mode, the dehumidifying and heating mode, the dehumidifying and cooling mode, the cooling mode, the MAX cooling mode (maximum cooling mode), and the auxiliary heater single mode. Description will initially be made as to an outline of a flow and control of the refrigerant in each operation mode.

(1) Heating Mode

When the heating mode is selected by the heat pump controller 32 (an automatic mode) or a manual operation to the air conditioning operating portion 53 (a manual mode), the heat pump controller 32 opens the solenoid valve 21 (for the heating) and closes the solenoid valve 17 (for the cooling). The heat pump controller 32 also opens the solenoid valve 30 (for the reheating) and closes the solenoid valve 40 (for the bypass). Then, the heat pump controller 32 operates the compressor 2. The air conditioning controller 20 operates the respective blowers 15 and 27, and the air mix damper 28 basically has a state of passing all the air in the air flow passage 3, which is blown out from the indoor blower 27 and then flows via the heat absorber 9, through the auxiliary heater 23 and the radiator 4 in the heating heat exchange passage 3A, but may adjust an air volume.

In consequence, a high-temperature high-pressure gas refrigerant discharged from the compressor 2 flows from the refrigerant pipe 13G into the radiator 4 via the solenoid valve 30. The air in the air flow passage 3 passes through the radiator 4, and hence the air in the air flow passage 3 is heated by the high-temperature refrigerant in the radiator 4 (by the auxiliary heater 23 and the radiator 4 when the auxiliary heater 23 operates). On the other hand, the refrigerant in the radiator 4 has the heat taken by the air and is cooled to condense and liquefy.

The refrigerant liquefied in the radiator 4 flows out from the radiator 4 and then flows through the refrigerant pipe 13E to reach the outdoor expansion valve 6. The refrigerant flowing into the outdoor expansion valve 6 is decompressed therein, and then flows into the outdoor heat exchanger 7. The refrigerant flowing into the outdoor heat exchanger 7 evaporates, and the heat is pumped up from the outdoor air passed by running or the outdoor blower 15. In other words, the refrigerant circuit R functions as a heat pump. Then, the low-temperature refrigerant flowing out from the outdoor heat exchanger 7 flows through the refrigerant pipe 13A, the solenoid valve 21, and the refrigerant pipe 13D, and flows from the refrigerant pipe 13C into the accumulator 12 to perform gas-liquid separation thereat, and thereafter the gas refrigerant is sucked into the compressor 2, thereby repeating this circulation. The air heated by the radiator 4 (the auxiliary heater 23 and the radiator 4 when the auxiliary heater 23 operates) is blown out from the respective outlets 29A through 29C, and hence the heating of the vehicle interior is performed.

The heat pump controller 32 calculates a target radiator pressure PCO (a target value of the radiator pressure PCI) from a target heater temperature TCO (a target value of the radiator temperature TCI) calculated from a target outlet temperature TAO by the air conditioning controller 20, and controls the number of revolutions NC of the compressor 2 on the basis of the target radiator pressure PCO and the refrigerant pressure (the radiator pressure PCI that is a high pressure of the refrigerant circuit R) of the radiator 4 which is detected by the radiator pressure sensor 47 to control heating by the radiator 4. Further, the heat pump controller 32 controls a valve position of the outdoor expansion valve 6 on the basis of the refrigerant temperature (the radiator temperature TCI) of the radiator 4 which is detected by the radiator temperature sensor 46 and the radiator pressure PCI detected by the radiator pressure sensor 47, and controls a subcool degree SC of the refrigerant in the outlet of the radiator 4.

Further, when the heating capability by the radiator 4 runs shorter than a heating capability required for vehicle-interior air conditioning in the heating mode, the heat pump controller 32 controls energization of the auxiliary heater 23 to complement its lack by the generation of heat by the auxiliary heater 23. Thus, the comfortable heating of the vehicle interior is achieved and frosting of the outdoor heat exchanger 7 is also suppressed. At this time, since the auxiliary heater 23 is disposed on the air upstream side of the radiator 4, the air flowing through the air flow passage 3 passes through the auxiliary heater 23 before the radiator 4.

Here, when the auxiliary heater 23 is disposed on the air downstream side of the radiator 4, the temperature of the air flowing into the auxiliary heater 23 rises by the radiator 4 where the auxiliary heater 23 is constituted of the PTC heater as in the embodiment. Hence, a resistance value of the PTC heater becomes large and a current value thereof also becomes low, so that its generated heat amount is reduced, but the capability of the auxiliary heater 23 constituted of the PTC heater as in the embodiment can be exhibited sufficiently by disposing the auxiliary heater 23 on the air upstream side of the radiator 4.

(2) Dehumidifying and Heating Mode (Operation Mode in the Present Invention)

Next, in the dehumidifying and heating mode, the heat pump controller 32 opens the solenoid valve 17 and closes the solenoid valve 21. Further, the heat pump controller 32 closes the solenoid valve 30 and opens the solenoid valve 40, and fully closes the valve position of the outdoor expansion valve 6. Then, the heat pump controller 32 operates the compressor 2. The air conditioning controller 20 operates the respective blowers 15 and 27, and the air mix damper 28 basically has a state of passing all the air in the air flow passage 3, which is blown out from the indoor blower 27 and then flows via the heat absorber 9, through the auxiliary heater 23 and the radiator 4 in the heating heat exchange passage 3A, but performs an air volume adjustment as well.

Consequently, the high-temperature high-pressure gas refrigerant discharged from the compressor 2 to the refrigerant pipe 13G flows into the bypass pipe 35 without flowing to the radiator 4 and reaches the refrigerant pipe 13E on the downstream side of the outdoor expansion valve 6 through the solenoid valve 40. At this time, since the outdoor expansion valve 6 is fully closed, the refrigerant flows into the outdoor heat exchanger 7. The refrigerant flowing into the outdoor heat exchanger 7 is cooled by the running therein or the outdoor air to pass through the outdoor blower 15, to condense. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 enters the refrigerant pipe 13B and reaches the indoor expansion valve 8 through the internal heat exchanger 19. After the refrigerant is decompressed in the indoor expansion valve 8, the refrigerant flows into the heat absorber 9 to evaporate. The air blown out from the indoor blower 27 is cooled by the heat absorbing operation at this time, and the water in the air coagulates to adhere to the heat absorber 9, and hence, the air in the air flow passage 3 is cooled and dehumidified. The refrigerant evaporated in the heat absorber 9 flows through the internal heat exchanger 19 to reach the accumulator 12 via the refrigerant pipe 13C, and is sucked into the compressor 2 therethrough, thereby repeating this circulation.

At this time, since the valve position of the outdoor expansion valve 6 is fully closed, it is possible to suppress or prevent the disadvantage that the refrigerant discharged from the compressor 2 reversely flows from the outdoor expansion valve 6 into the radiator 4. Thus, the lowering of a refrigerant circulation amount is suppressed or eliminated to enable an air conditioning capacity to be ensured. Further, in the dehumidifying and heating mode, the heat pump controller 32 energizes the auxiliary heater 23 to generate heat. Consequently, the air cooled and dehumidified in the heat absorber 9 is further heated in the process of passing through the auxiliary heater 23, and the temperature rises so that the dehumidifying and heating of the vehicle interior are performed.

The heat pump controller 32 controls the number of revolutions NC of the compressor 2 on the basis of a temperature (the heat absorber temperature Te) of the heat absorber 9 detected by the heat absorber temperature sensor 48 and a target heat absorber temperature TEO being a target value of the heat absorber temperature Te calculated by the air conditioning controller 20, and controls energization (heating by heat generation) of the auxiliary heater 23 on the basis of the auxiliary heater temperature Tptc detected by the auxiliary heater temperature sensor 50 and the above-described target heater temperature TCO (which becomes a target value of the auxiliary heater temperature Tptc in this case), thereby appropriately preventing the lowering of a temperature of the air to be blown out from the respective outlets 29A through 29C to the vehicle interior by the heating by the auxiliary heater 23 while appropriately performing the cooling and dehumidifying of the air by the heat absorber 9. Consequently, it is possible to control the temperature of the air blown out to the vehicle interior to a suitable heating temperature while dehumidifying the air, and to achieve comfortable and efficient dehumidifying and heating of the vehicle interior.

Incidentally, since the auxiliary heater 23 is disposed on the air upstream side of the radiator 4, the air heated in the auxiliary heater 23 passes through the radiator 4, but the refrigerant is not caused to flow into the radiator 4 in the dehumidifying and heating mode. Hence, there is also eliminated the disadvantage that the radiator 4 absorbs heat from the air heated by the auxiliary heater 23. That is, the temperature of the air blown out to the vehicle interior is suppressed from being lowered by the radiator 4, and a COP is also improved.

(3) Dehumidifying and Cooling Mode

Next, in the dehumidifying and cooling mode, the heat pump controller 32 opens the solenoid valve 17 and closes the solenoid valve 21. Further, the heat pump controller 32 opens the solenoid valve 30 and closes the solenoid valve 40. Then, the heat pump controller 32 operates the compressor 2. The air conditioning controller 20 operates the respective blowers 15 and 27, and the air mix damper 28 basically has a state of passing all the air in the air flow passage 3, which is blown out from the indoor blower 27 and then flows via the heat absorber 9, through the auxiliary heater 23 and the radiator 4 in the heating heat exchange passage 3A, but performs an adjustment of an air volume as well.

Thus, the high-temperature high-pressure gas refrigerant discharged from the compressor 2 flows from the refrigerant pipe 13G into the radiator 4 via the solenoid valve 30. Since the air in the air flow passage 3 passes through the radiator 4, the air in the air flow passage 3 is heated by the high-temperature refrigerant in the radiator 4, whereas the refrigerant in the radiator 4 has the heat taken by the air and is cooled to condense and liquefy.

The refrigerant flowing out from the radiator 4 flows through the refrigerant pipe 13E to reach the outdoor expansion valve 6, and flows through the outdoor expansion valve 6 controlled to slightly open, to flow into the outdoor heat exchanger 7. The refrigerant flowing into the outdoor heat exchanger 7 is cooled by the running therein or the outdoor air passed through the outdoor blower 15, to condense. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 enters the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence, the air is cooled and dehumidified.

The refrigerant evaporated in the heat absorber 9 flows through the internal heat exchanger 19 to reach the accumulator 12 through the refrigerant pipe 13C, and flows therethrough to be sucked into the compressor 2, thereby repeating this circulation. Since the heat pump controller 32 does not perform energization to the auxiliary heater 23 in the dehumidifying and cooling mode, the air cooled and dehumidified by the heat absorber 9 is reheated (radiation capability being lower than that during the heating) in the process of passing the radiator 4. Thus, the dehumidifying and cooling of the vehicle interior are performed.

The heat pump controller 32 controls the number of revolutions NC of the compressor 2 on the basis of the temperature (the heat absorber temperature Te) of the heat absorber 9 which is detected by the heat absorber temperature sensor 48, and the target heat absorber temperature TEO (transmitted from the air conditioning controller 20) being its target value. Also, the heat pump controller 32 calculates a target radiator pressure PCO from the above-described target heater temperature TCO, and controls the valve position of the outdoor expansion valve 6 on the basis of the target radiator pressure PCO and the refrigerant pressure (the radiator pressure PCI that is a high pressure of the refrigerant circuit R) of the radiator 4 which is detected by the radiator pressure sensor 47 to control heating by the radiator 4.

(4) Cooling Mode

Next, in the cooling mode, the heat pump controller 32 fully opens the valve position of the outdoor expansion valve 6 in the above state of the dehumidifying and cooling mode. Then, the heat pump controller 32 operates the compressor 2 and does not perform energization to the auxiliary heater 23. The air conditioning controller 20 operates the respective blowers 15 and 27, and the air mix damper 28 has a state of adjusting a ratio at which the air in the air flow passage 3 blown out from the indoor blower 27 and passed through the heat absorber 9 is to be passed through the auxiliary heater 23 and the radiator 4 in the heating heat exchange passage 3A.

Consequently, the high-temperature high-pressure gas refrigerant discharged from the compressor 2 flows from the refrigerant pipe 13G into the radiator 4 through the solenoid valve 30, and the refrigerant flowing out from the radiator 4 flows through the refrigerant pipe 13E to reach the outdoor expansion valve 6. At this time, the outdoor expansion valve 6 is fully opened, and hence, the refrigerant passes therethrough and flows into the outdoor heat exchanger 7 as it is, where the refrigerant is air-cooled by the running therein or the outdoor air to pass through the outdoor blower 15, to condense and liquefy. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 enters the refrigerant pipe 13B and reaches the indoor expansion valve 8 through the internal heat exchanger 19. The refrigerant is decompressed in the indoor expansion valve 8 and then flows into the heat absorber 9 to evaporate. The air blown out from the indoor blower 27 is cooled by the heat absorbing operation at this time. Further, the water in the air coagulates to adhere to the heat absorber 9.

The refrigerant evaporated in the heat absorber 9 flows through the internal heat exchanger 19 to reach the accumulator 12 through the refrigerant pipe 13C, and flows therethrough to be sucked into the compressor 2, thereby repeating this circulation. The air cooled and dehumidified in the heat absorber 9 is blown out from the respective outlets 29A through 29C to the vehicle interior (a part thereof passes through the radiator 4 to perform heat exchange), thereby performing the cooling of the vehicle interior. Further, in this cooling mode, the heat pump controller 32 controls the number of revolutions NC of the compressor 2 on the basis of the temperature (the heat absorber temperature Te) of the heat absorber 9 which is detected by the heat absorber temperature sensor 48, and the above-described target heat absorber temperature TEO being its target value.

(5) MAX Cooling Mode (Maximum Cooling Mode: Operation Mode in the Present Invention)

Next, in the MAX cooling mode as the maximum cooling mode, the heat pump controller 32 opens the solenoid valve 17 and closes the solenoid valve 21. Further, the heat pump controller 32 closes the solenoid valve 30 and opens the solenoid valve 40, and fully closes the valve position of the outdoor expansion valve 6. Then, the heat pump controller 32 operates the compressor 2 and does not perform energization to the auxiliary heater 23. The air conditioning controller 20 operates the respective blowers 15 and 27, and the air mix damper 28 has a state of adjusting a ratio at which the air in the air flow passage 3 blown out from the indoor blower 27 and passed through the heat absorber 9 is to be passed through the auxiliary heater 23 and the radiator 4 in the heating heat exchange passage 3A.

Thus, the high-temperature high-pressure gas refrigerant discharged from the compressor 2 to the refrigerant pipe 13G flows into the bypass pipe 35 without flowing to the radiator 4, and reaches the refrigerant pipe 13E on the downstream side of the outdoor expansion valve 6 through the solenoid valve 40. At this time, since the outdoor expansion valve 6 is fully closed, the refrigerant flows into the outdoor heat exchanger 7. The refrigerant flowing into the outdoor heat exchanger 7 is air-cooled by the running therein or the outdoor air to pass through the outdoor blower 15, to condense. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 enters the refrigerant pipe 13B and reaches the indoor expansion valve 8 through the internal heat exchanger 19. The refrigerant is decompressed in the indoor expansion valve 8 and then flows into the heat absorber 9 to evaporate. The air blown out from the indoor blower 27 is cooled by the heat absorbing operation at this time. Further, since the water in the air coagulates to adhere to the heat absorber 9, the air in the air flow passage 3 is dehumidified. A circulation is repeated in which the refrigerant evaporated in the heat absorber 9 flows through the internal heat exchanger 19 to reach the accumulator 12 via the refrigerant pipe 13C, and flows therethrough to be sucked into the compressor 2. At this time, since the outdoor expansion valve 6 is fully closed, it is possible to similarly suppress or prevent the disadvantage that the refrigerant discharged from the compressor 2 reversely flows from the outdoor expansion valve 6 to the radiator 4. Thus, the lowering of a refrigerant circulation amount is suppressed or eliminated to enable an air conditioning capacity to be ensured.

Here, since the high-temperature refrigerant flows into the radiator 4 in the above-described cooling mode, direct heat conduction from the radiator 4 to the HVAC unit 10 occurs in no small way. Since, however, the refrigerant does not flow into the radiator 4 in the MAX cooling mode, the air in the air flow passage 3 from the heat absorber 9 is not heated by the heat transferred from the radiator 4 to the HVAC unit 10. Therefore, the strong cooling of the vehicle interior is performed, and under such an environment that the outdoor air temperature Tam is high in particular, the vehicle interior is rapidly cooled to make it possible to achieve comfortable vehicle interior air conditioning. Further, even in the MAX cooling mode, the heat pump controller 32 controls the number of revolutions NC of the compressor 2 on the basis of the temperature (the heat absorber temperature Te) of the heat absorber 9 which is detected by the heat absorber temperature sensor 48, and the above-mentioned target heat absorber temperature TEO being its target value.

(6) Auxiliary Heater Single Mode

Incidentally, the control device 11 of the embodiment has an auxiliary heater single mode of in the cases such as when excessive frosting occurs in the outdoor heat exchanger 7, etc., stopping the compressor 2 and the outdoor blower 15 in the refrigerant circuit R, and energizing the auxiliary heater 23 to heat the vehicle interior only by the auxiliary heater 23. Even in this case, the heat pump controller 32 controls energization (heat generation) of the auxiliary heater 23 on the basis of the auxiliary heater temperature Tptc detected by the auxiliary heater temperature sensor 50 and the above-described target heater temperature TCO.

Further, the air conditioning controller 20 operates the indoor blower 27, and the air mix damper 28 has a state of passing the air in the air flow passage 3, which is blown out from the indoor blower 27, through the auxiliary heater 23 of the heating heat exchange passage 3A to adjust an air volume. The air heated by the auxiliary heater 23 is blown out from the respective outlets 29A through 29C to the vehicle interior, and hence the heating of the vehicle interior is performed.

(7) Changing of Operation Mode

The air conditioning controller 20 calculates the aforementioned target outlet temperature TAO from the following equation (I). The target outlet temperature TAO is a target value of the temperature of the air blown out to the vehicle interior.

$$TAO=(Tset-Tin) \times K+Tbal(f(Tset,SUN,Tam)) \qquad (I)$$

where Tset is a predetermined temperature of the vehicle interior which is set by the air conditioning operating portion 53, Tin is an interior temperature detected by the indoor air temperature sensor 37, K is a coefficient, and Tbal is a balance value calculated from the predetermined value Tset, the solar radiation amount SUN detected by the solar radiation sensor 51, and the outdoor air temperature Tam detected by the outdoor air temperature sensor 33. Further, in general, the lower the outdoor air temperature Tam is, the higher the target outlet temperature TAO becomes, and the target outlet temperature TAO is lowered with rising of the outdoor air temperature Tam.

The heat pump controller 32 selects any operation mode from the above respective operation modes on the basis of the outdoor air temperature Tam (detected by the outdoor air temperature sensor 33) and the target outlet temperature TAO transmitted from the air conditioning controller 20 via the vehicle communication bus 65 on startup, and transmits the respective operation modes to the air conditioning controller 20 through the vehicle communication bus 65. Further, after the startup, the heat pump controller 32 changes the respective operation modes on the basis of parameters such as the outdoor air temperature Tam, the humidity of the vehicle interior, the target outlet temperature TAO, a heating temperature TH (a temperature of the air on the leeward side of the radiator 4, which is an estimated value) to be described later, the target heater temperature TCO, the heat absorber temperature Te, the target heat absorber temperature TEO, the presence or absence of a dehumidifying request for the vehicle interior, etc. and thereby appropriately changes the heating mode, the dehumidifying and heating mode, the dehumidifying and cooling mode, the cooling mode, the MAX cooling mode, and the auxiliary heater single mode according to environment conditions or the necessity of dehumidifying to control the temperature of the air blown out to the vehicle interior to the target outlet temperature TAO, thereby achieving comfortable and efficient vehicle interior air conditioning.

(8) Control of Compressor 2 in Heating Mode by Heat Pump Controller 32

Figure 4:
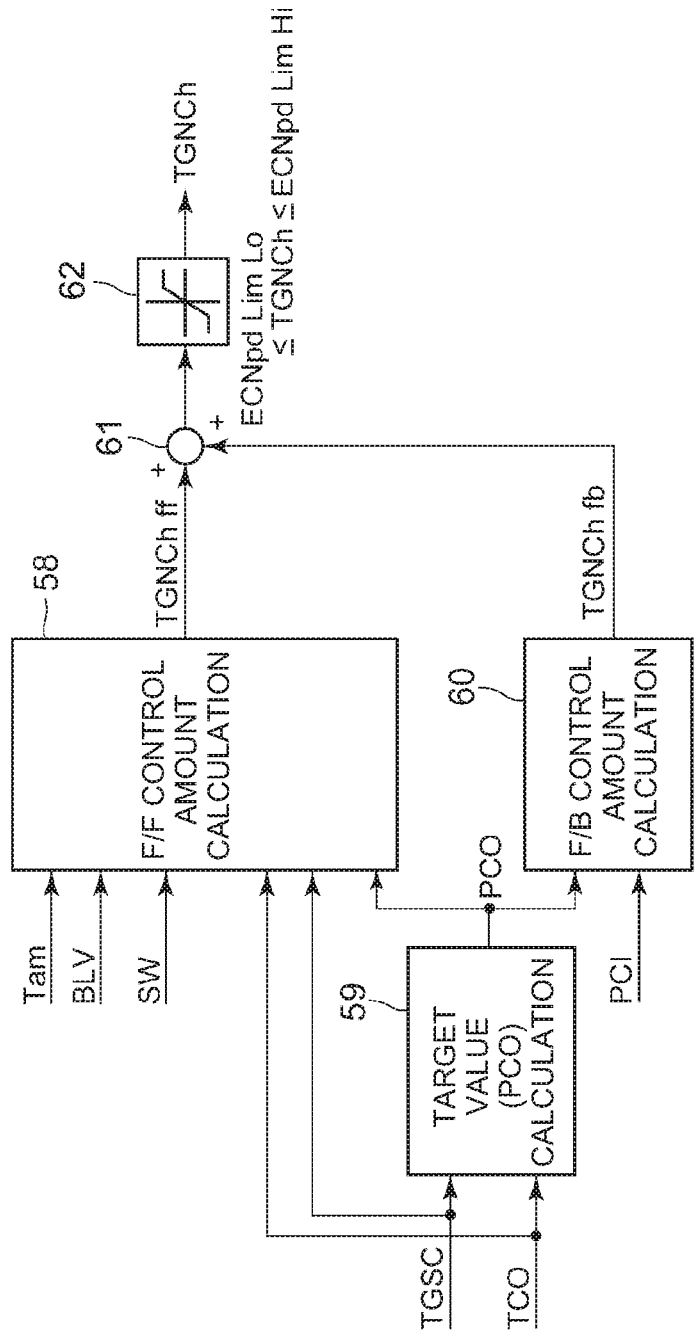
FIG. 4 is a control block diagram concerning compressor control in a heating mode of a heat pump controller of FIG. 2.

Next, description will be made as to control of the compressor 2 in the aforementioned heating mode in detail using FIG. 4. FIG. 4 is a control block diagram of the heat pump controller 32 which determines a target number of revolutions (a compressor target number of revolutions) TGNCh of the compressor 2 for the heating mode. An F/F (feedforward) control amount calculation section 58 of the heat pump controller 32 calculates an F/F control amount TGNChff of the compressor target number of revolutions on the basis of the outdoor air temperature Tam obtainable from the outdoor air temperature sensor 33, a blower voltage BLV of the indoor blower 27, an air volume ratio SW by the air mix damper 28, which is obtained by SW=(TAO−Te)/(TH−Te), a target subcool degree TGSC that is a target value of a subcool degree SC in the outlet of the radiator 4, the above-mentioned target heater temperature TCO (transmitted from the air conditioning controller 20) that is the target value of the temperature of the radiator 4, and the target radiator pressure PCO that is the target value of the pressure of the radiator 4.

Here, the above TH used to calculate the air volume ratio SW is a temperature (hereinafter called a heating temperature) of the air on the leeward side of the radiator 4. The heat pump controller 32 estimates the TH from a first-order lag calculation formula (II) shown below:

$$TH=(INTL \times TH0+Tau \times THz)/(Tau+INTL) \quad (II)$$

where INTL is a calculation period (constant), Tau is a time constant of a first-order lag, TH0 is a steady-state value of the heating temperature TH in a steady state before a first-order lag calculation, and THz is a previous value of the heating temperature TH. Estimating the heating temperature TH in this manner makes it unnecessary to provide a special temperature sensor.

Incidentally, the heat pump controller 32 changes the above time constant Tau and steady-state value TH0 according to the aforementioned operation modes to thereby make the above-described estimation formula (II) different depending on the operation mode to estimate the heating temperature TH. Then, the heating temperature TH is transmitted to the air conditioning controller 20 through the vehicle communication bus 65.

The target radiator pressure PCO is calculated by the target value calculation section 59 on the basis of the above target subcool degree TGSC and target heater temperature TCO. Further, an F/B (feedback) control amount calculation section 60 calculates an F/B control amount TGNChfb of a compressor target number of revolutions on the basis of the target radiator pressure PCO and the radiator pressure PCI being the refrigerant pressure of the radiator 4. Then, the F/F control amount TGNCnff calculated by the F/F control amount calculation section 58 and TGNChfb calculated by the F/B control amount calculation section 60 are added in an adder 61, and its result is added with limits of an upper limit value ECNpdLimHi of controlling and a lower limit value ECNpdLimLo of controlling in a limit setting section 62, followed by being determined as the compressor target number of revolutions TGNCh. In the heating mode, the heat pump controller 32 controls the number of revolutions NC of the compressor 2 on the basis of the compressor target number of revolutions TGNCh.

(9) Control of Compressor 2 and Auxiliary Heater 23 in Dehumidifying and Heating Mode by Heat Pump Controller 32

Figure 5:
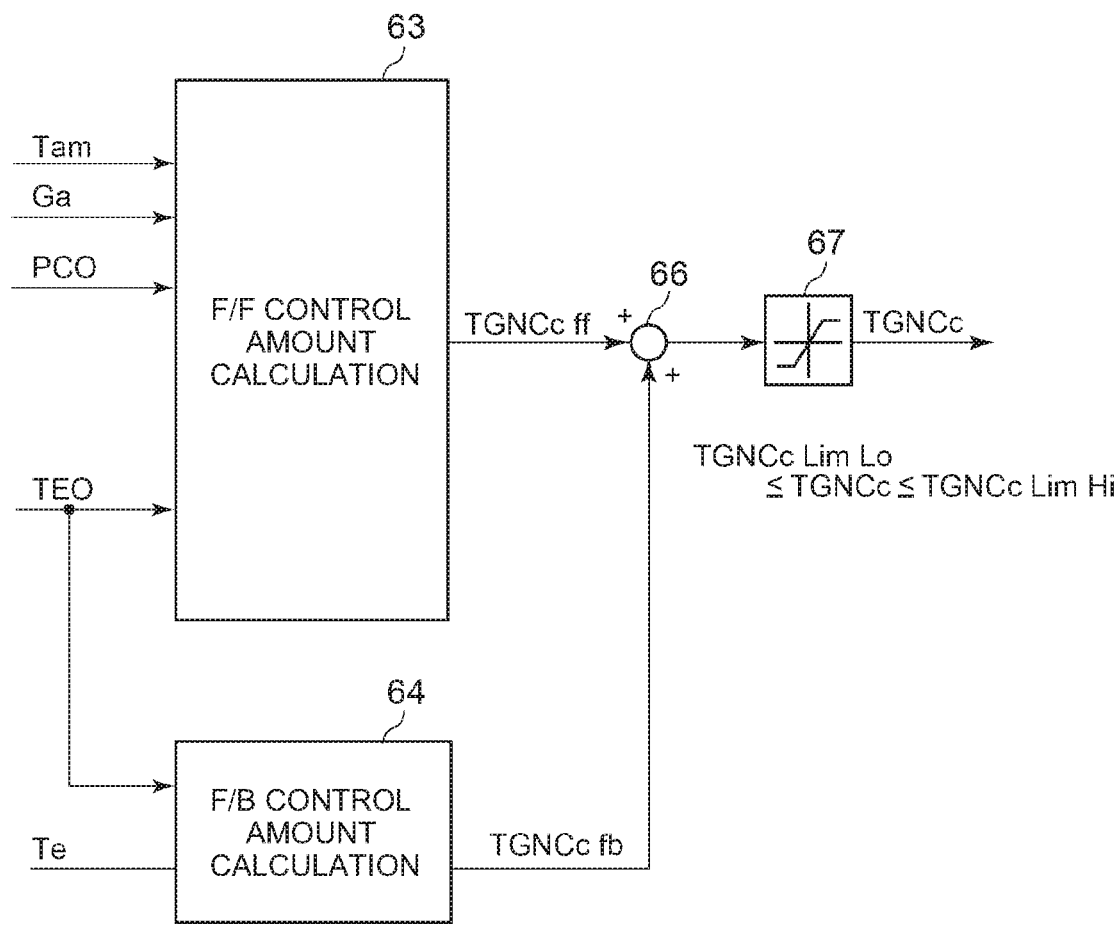
FIG. 5 is a control block diagram concerning compressor control in a dehumidifying and heating mode of the heat pump controller of FIG. 2.

On the other hand, FIG. 5 is a control block diagram of the heat pump controller 32 which determines a target number of revolutions (a compressor target number of revolutions) TGNCc of the compressor 2 for the dehumidifying and heating mode. The F/F control amount calculation section 63 of the heat pump controller 32 calculates an F/F control amount TGNCcff of the compressor target number of revolutions on the basis of the outdoor air temperature Tam, the volumetric air volume Ga of the air flowing into the air flow passage 3, the target radiator pressure PCO being a target value of the pressure (the radiator pressure PCI) of the radiator 4, and the target heat absorber temperature TEO being a target value of the temperature (the heat absorber temperature Te) of the heat absorber 9.

Further, the F/B control amount calculation section 64 calculates an F/B control amount TGNCcfb of the compressor target number of revolutions on the basis of the target heat absorber temperature TEO (transmitted from the air conditioning controller 20), and the heat absorber temperature Te. Then, the F/F control amount TGNCcff calculated by the F/F control amount calculation section 63 and the F/B control amount TGNCcfb calculated by the F/B control amount calculation section 64 are added in an adder 66, and its result is added with limits of an upper limit value TGNCcLimHi of controlling and a lower limit value TGNCcLimLo of controlling in a limit setting section 67 and then determined as the compressor target number of revolutions TGNCc. In the dehumidifying and heating mode, the heat pump controller 32 controls the number of revolutions NC of the compressor 2 on the basis of the compressor target number of revolutions TGNCc.

Figure 6:
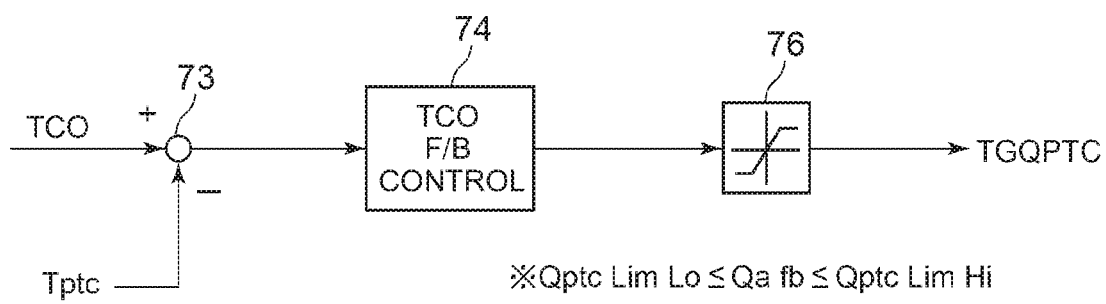
FIG. 6 is a control block diagram concerning auxiliary heater (auxiliary heating device) control in the dehumidifying and heating mode of the heat pump controller of FIG. 2.

Further, FIG. 6 is a control block diagram of the heat pump controller 32 which determines an auxiliary heater required capability TGQPTC of the auxiliary heater 23 in the dehumidifying and heating mode. The target heater temperature TCO and the auxiliary heater temperature Tptc are input to a subtractor 73 of the heat pump controller 32 to calculate a deviation (TCO−Tptc) between the target heater temperature TCO and the auxiliary heater temperature Tptc. The deviation (TCO−Tptc) is input to the F/B control section 74. The F/B control section 74 eliminates the deviation (TCO−Tptc) and calculates an auxiliary heater required capability F/B control amount so that the auxiliary heater temperature Tptc becomes the target heater temperature TCO.

The auxiliary heater required capability F/B control amount Qafb calculated in the F/B control section 74 is added with an upper limit value QptcLimHi of controlling and a lower limit value QptcLimLo of controlling in a limit setting section 76 and then determined as the auxiliary heater required capability TGQPTC. In the dehumidifying and heating mode, the controller 32 controls energization to the auxiliary heater 23 on the basis of the auxiliary heater required capability TGQPTC to thereby control heat generation (heating) of the auxiliary heater 23 such that the auxiliary heater temperature Tptc becomes the target heater temperature TCO.

Thus, in the dehumidifying and heating mode, the heat pump controller 32 controls the operation of the compressor on the basis of the heat absorber temperature Te and the target heat absorber temperature TEO, and controls the heat generation of the auxiliary heater 23 on the basis of the target heater temperature TCO, thereby appropriately controlling cooling and dehumidifying by the heat absorber 9 and heating by the auxiliary heater 23 in the dehumidifying and heating mode. Consequently, while more adequately dehumidifying the air blown out to the vehicle interior, the temperature of the air can be controlled to a more accurate heating temperature, and more comfortable and efficient dehumidifying and heating of the vehicle interior can be achieved.

(10) Control of Air Mix Damper 28

Figure 3:
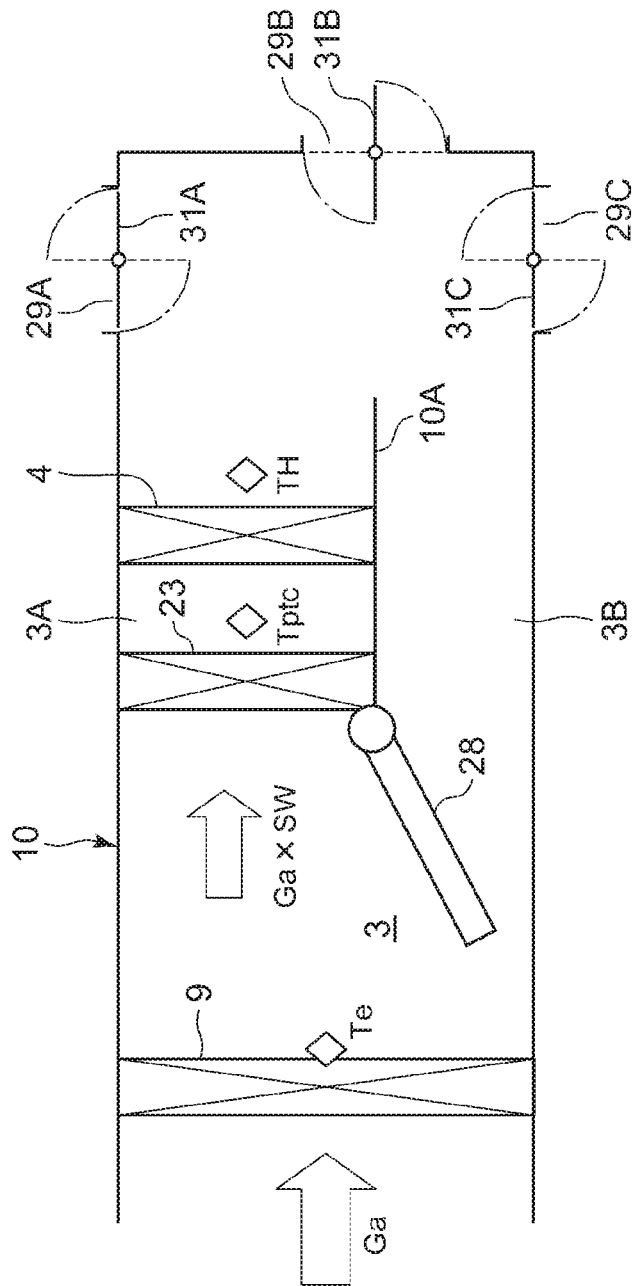
FIG. 3 is a typical diagram of an air flow passage of the vehicle air-conditioning device of FIG. 1.

Next, description will be made as to control of the air mix damper 28 by the air conditioning controller 20 while referring to FIG. 3. In FIG. 3, Ga is a volumetric air volume of the air flowing into the above-described air flow passage 3, Te is a heat absorber temperature, and TH is the above-described heating temperature (the temperature of the air on the leeward side of the radiator 4).

On the basis of the air volume ratio SW calculated by the equation (the following equation (III)) and passed through the radiator 4 and the auxiliary heater 23 in the heating heat exchange passage 3A as described above, the air conditioning controller 20 controls the air mix damper 28 so that the air is brought to an air volume of the corresponding ratio, and thereby adjusts an amount of the air passed through the radiator 4 (and the auxiliary heater 23).

$$SW=(TAO-Te)/(TH-Te) \qquad (III)$$

That is, the air volume ratio SW at which the air is passed through the radiator 4 and the auxiliary heater 23 in the heating heat exchange passage 3A changes within a range of 0≤SW≤1. ⌈0⌋ indicates an air mix fully-closed state in which all the air in the air flow passage 3 is to be passed through the bypass passage 3B without passing it through the heating heat exchange passage 3A, and ⌈1⌋ indicates an air mix fully-opened state in which all the air in the air flow passage 3 is to be passed through the heating heat exchange passage 3A. That is, the air volume to the radiator 4 becomes GaxSW.

(11) Solenoid Valves 30, 40, 17, and 21

Here, the solenoid valve 30 (the first opening/closing valve of the present invention) for the reheating and the solenoid valve 17 for the cooling are the so-called normally opened pilot type solenoid valves which are energized and thereby closed and are opened in the non-energization state as shown in Patent Document 3 described above. With the energization/non-energization to the solenoid, the difference in pressure between the refrigerant inflow side and the refrigerant outflow side is used, and the refrigerant circuit is closed/opened by a main valve body with the pressure difference, a biasing force of a coil spring, and a balance due to the own weights of a plunger and the main valve body (valve body). Thus, the solenoid valve 30 and the solenoid valve 17 are assumed to be opened during the operation stop of the vehicle air-conditioning device 1.

Further, the solenoid valve 40 (the opening/closing valve of the present invention that is the second opening/closing valve) for the bypass and the solenoid valve 21 for the heating are the so-called normally-closed pilot type solenoid valves which are energized and thereby opened and are closed in the non-energization state as shown in Patent Document 2 described above. With the energization/non-energization to the solenoid, the difference in pressure between the refrigerant inflow side and the refrigerant outflow side is used, and the refrigerant circuit is opened/closed by the main valve body with the pressure difference, the biasing force of the coil spring, and the balance due to the own weights of the plunger and the main valve body (valve body). Thus, the solenoid valve 40 and the solenoid valve 21 are assumed to be closed during the operation stop of the vehicle air-conditioning device 1.

(12) Noise Improvement Control when Stopping Vehicle Air-Conditioning Device 1 from MAX Cooling Mode Next, description will be made as to noise improvement control executed buy the heat pump controller 32 when stopping the vehicle air-conditioning device 1 from operating from the aforementioned MAX cooling mode (the maximum cooling mode) with reference to FIGS. 7 and 9. Timing charts of FIGS. 7 and 9 respectively show an operation state (the number of revolutions is NC and an NC operating range is from 800 rpm to 7000 rpm) of the compressor 2 when the MAX cooling mode is started, and then the operation of the vehicle air-conditioning device 1 is stopped from the MAX cooling mode, a valve position (unit pulse) of the outdoor expansion valve 6, and opening/closing states of the solenoid valve 40 (for the bypass, which is the opening/closing valve of the present invention or the second opening/closing valve), and the solenoid valve 30 (for the reheating, which is the first opening/closing valve of the present invention).

Here, the heat pump controller 32 calculates and monitors a pressure difference ΔPdc in before and after the solenoid valve 30 (the first opening/closing valve) as a difference (ΔPdc=Pd−PCI) between the pressure Pd on the refrigerant inflow side (front) of the solenoid valve 30, which is detected by the discharge pressure sensor 42, and the radiator pressure PCI being the pressure on the refrigerant outflow side (behind) of the solenoid valve 30, which is detected by the radiator pressure sensor 47.

(12-1) Noise Improvement Control when Stopping Operation of Vehicle Air-Conditioning Device 1 from MAX Cooling Mode (Part 1)

First, when the operation of the vehicle air-conditioning device 1 is stopped from the MAX cooling mode, the pressure difference ΔPdc in before and after the solenoid valve 30 becomes a large value in the MAX cooling mode. Further, the solenoid valve 30 is opened in a non-energization (operation stop) state. Therefore, when the solenoid valve 30 being closed in the MAX cooling mode is non-energized (stopped in operation) and thereby opened with such a pressure difference held as it is, the refrigerant abruptly flows into the refrigerant pipe 13G in the direction from the discharge side of the compressor 2 to the inlet side of the radiator 4 through the solenoid valve 30, so that loud sound (noise) is generated in the solenoid valve 30.

Figure 9:
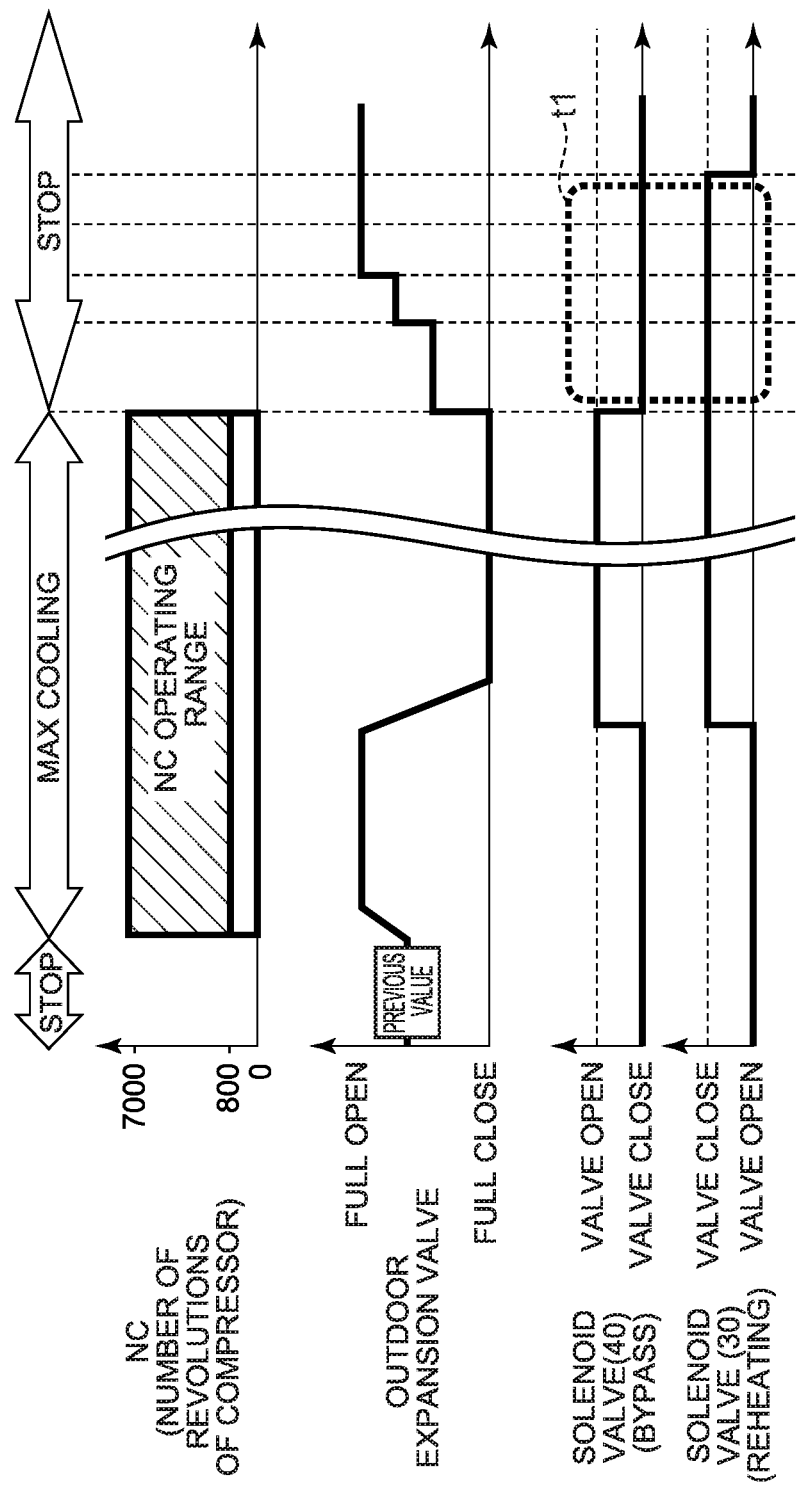
FIG. 9 is a timing chart when upon stopping the operation from the MAX cooling mode, a solenoid valve for reheating is closed and a solenoid valve for bypass is closed.

Thus, when the operation of the vehicle air-conditioning device 1 is stopped from the state in which it is operating in the MAX cooling mode (the compressor 2 is being operated at the number of revolutions NC in the operating range), the solenoid valve 30 is maintained in an energization state to prohibit the solenoid valve 30 from opening as shown in FIG. 9. Then, the compressor 2 is stopped, the solenoid valve 40 is closed (non-energization), the outdoor expansion valve 6 is opened from its fully-closed state, and the valve position thereof is opened to its fully-opened state. The pressure of the outdoor heat exchanger 7 being taken as the high pressure side of the refrigerant circuit R in the MAX cooling mode when the compressor 2 is stopped and the outdoor expansion valve 6 is opened, is released to the radiator 4 side through the outdoor expansion valve 6, and hence, the pressure difference ΔPdc in before and after the solenoid valve 30 is also equalized and reduced.

Then, if the solenoid valve 30 is opened with being non-energized, and the operation of the vehicle air-conditioning device 1 is stopped in terms of its operation where a prescribed period t1 has elapsed from the stop of the compressor 2, for example, the noise generated due to the refrigerant abruptly flowing to the radiator 4 side when the solenoid valve 30 is opened, can be eliminated/reduced by the pressure difference ΔPdc in before and after the solenoid valve 30 when stopping the vehicle air-conditioning device from the state of being operated in the MAX cooling mode.

However, the solenoid valve 30 and the solenoid valve 40 are closed during a period (a period of t1 surrounded by a broken line in FIG. 9) up to the time when the compressor 2 is stopped, the outdoor expansion valve 6 starts to open, and the solenoid valve 30 is opened. That is, a region surrounded by the discharge side of the compressor 2 in the refrigerant circuit R, and the respective solenoid valves 30 and 40 turns into a closed state.

On the other hand, there is normally provided in the compressor 2, a structure of equalizing in pressure between the refrigerant discharge side and the refrigerant suction side where the compressor 2 is stopped. Further, when the compressor 2 is stopped, the refrigerant flows from the refrigerant discharge side to the refrigerant suction side even from a discharge valve provided thereinside. Therefore, even if the outdoor expansion valve 6 starts to open, a decompression speed at the refrigerant inflow side becomes faster than that on the refrigerant outflow side in the solenoid valve 30 and the solenoid valve 40 after the compressor 2 is stopped. With that view, there occurs a pressure reversal in which the pressures on the refrigerant inflow sides of the solenoid valve 30 and the solenoid valve 40 become lower than the pressure on the refrigerant outflow side.

When a counterpressure is applied to the solenoid valve 40 in the non-energization state (when the pressure on the refrigerant outflow side is higher than that on the refrigerant inflow side), the internal valve body is pushed up and opened by the pressure on the refrigerant outflow side. In particular, since the solenoid valve 40 of the embodiment is the normally closed pilot type solenoid valve of operating the main valve body by utilizing the pressure difference between the refrigerant inflow side and the refrigerant outflow side as described above, the balance for maintaining the main valve body in the closed state is easy to collapse. Further, since the main valve body is then closed again by the biasing force of the coil spring, such opening/closing is performed finely to generate vibration and noise.

Further, when the solenoid valve 30 is non-energized in a state in which the counterpressure is similarly applied to the solenoid valve 30 (the pressure on the refrigerant outflow side is higher than that on the refrigerant inflow side), the internal valve body is pushed up by the pressure on the refrigerant outflow side, so that the valve body cannot be fully opened. In particular, since the solenoid valve 30 of the embodiment is the normally opened pilot type solenoid valve of operating the main valve body by utilizing the pressure difference between the refrigerant inflow side and the refrigerant outflow side as described above, the balance for maintaining the main valve body in the opened state is easy to collapse. Therefore, the main valve body becomes an unstable state, and hence vibration and noise are generated.

Thus, the heat pump controller 32 executes noise improvement control to be described below when stopping the operation of the vehicle air-conditioning device 1 from the MAX cooling mode. In other words, when the operation of the vehicle air-conditioning device 1 is stopped from the state (the compressor 2 being in operation at the number of revolutions NC in the operating range) in which it is operating in the MAX cooling mode, the heat pump controller 32 maintains the solenoid valve 40 in an energization state even after the compressor 2 is stopped as shown in FIG. 7, to maintain the solenoid valve 40 in an opened state. Further, the heat pump controller 32 maintains even the solenoid valve 30 in an energization state to maintain the solenoid valve 30 in a closed state.

Further, in the embodiment, the heat pump controller 32 opens the outdoor expansion valve 6 simultaneously with the stop of the compressor 2 and enlarges its valve position. Consequently, the pressure on the discharge side of the compressor 2 is released to the radiator 4 side through the opened solenoid valve 40 and outdoor expansion valve 6, and the pressure is equalized between the front and back of the solenoid valve 30. Then, when the valve position of the outdoor expansion valve 6 assumes a predetermined valve position, in the embodiment, assumes full open, the heat pump controller 32 performs non-energization to the solenoid valve 30 and the solenoid valve 40 to stop operating. In other words, the vehicle air-conditioning device 1 maintains the power supply of the control device 11 (the air conditioning controller 20 and the heat pump controller 32) in an ON state until the outdoor expansion valve 6 is fully opened (the power is supplied). When the outdoor expansion valve 6 is fully opened, the vehicle air-conditioning device 1 turns OFF the power of the control device 11 (the supply of the power is shut off), and does not energize both the solenoid valve 30 and the solenoid valve 40. The solenoid valve 30 is opened with being non-energized, and the solenoid valve 40 is closed with being non-energized.

Thus, when the vehicle air-conditioning device 1 stops operating from the state of being operated in the MAX cooling mode, the heat pump controller 32 closes the solenoid valve 30 even after the compressor 2 is stopped, and maintains the solenoid valve 40 in the opened state. Therefore, when the vehicle air-conditioning device 1 stops operating from the state of being operated in the MAX cooling mode, the region surrounded by the discharge side of the compressor 2, and the solenoid valve 30 and the solenoid valve 40 is brought into the closed state. The decompression speed at the refrigerant inflow side of each of the subsequent solenoid valves 30 and 40 is faster than that on the refrigerant outflow side, whereby it is possible to eliminate the application of the counterpressure to the respective solenoid valves 30 and 40.

Owing to these, vibration and noise generated by the application of the counterpressure to each of the solenoid valves 30 and 40 can be eliminated or suppressed. This is particularly effective where as in the embodiment, each of the solenoid valves 30 and 40 is constituted of the pilot type solenoid valve in which the main valve body is operated by using the pressure difference between the refrigerant inflow side and the refrigerant outflow side.

Further, in the embodiment, since the heat pump controller 32 stops the compressor 2 and opens the outdoor expansion valve 6 when stopping the operation of the vehicle air-conditioning device from the state in which it is operating in the MAX cooling mode, it is possible to release the pressure on the discharge side of the compressor 2 to the radiator 4 side through the outdoor expansion valve 6 after the stop of the compressor 2 and rapidly equalize in pressure between the refrigerant inflow side (front) and the refrigerant outflow side (back) of the solenoid valve 30. Further, in the embodiment, since the solenoid valve 30 is opened and the solenoid valve 40 is closed where the valve position of the outdoor expansion valve 6 is made fully open, it is possible to reliably eliminate or suppress the vibration and noise generated due to the application of the counterpressure to each of the solenoid valves 30 and 40.

Incidentally, in the above embodiment, the solenoid valve 30 is opened and the solenoid valve 40 is closed when the outdoor expansion valve 6 is fully opened. However, when the valve position is enlarged to a valve position (e.g., 80% or 90% or the like) near the full opening, the solenoid valve 30 and the solenoid valve 40 may respectively be opened and closed. Even by that, the vibration and noise generated due to the application of the counterpressure to each of the solenoid valves 30 and 40 can be reliably eliminated or suppressed.

(12-2) Noise Improvement Control when Stopping Operation of Vehicle Air-Conditioning Device 1 from MAX Cooling Mode (Part 2)

Further, there is no limitation to the control of opening the solenoid valve 30 and closing the solenoid valve 40, depending on the valve position of the outdoor expansion valve 6 as in the embodiment. Alternatively, in addition to such control, when the pressure difference ΔPdc in before and after the solenoid valve 30 is reduced to a predetermined value (a predetermined low value that is 10 kPa or the like, for example), the power of the control device 11 is turned OFF, and the solenoid valve 30 and the solenoid valve 40 may be made non-energized to open the solenoid valve 30 and close the solenoid valve 40.

Even in the control by such a pressure difference ΔPdc, it is possible to appropriately eliminate or suppress the vibrations and noise generated due to the application of the counterpressure to each of the solenoid valves 30 and 40. Further, when the control by the pressure difference ΔPdc is performed in addition to the control by the valve position of the outdoor expansion valve 6, the solenoid valve 30 is opened and the solenoid valve 40 is closed where the pressure difference ΔPdc is reduced to the predetermined value before the outdoor expansion valve 6 is enlarged to the aforementioned full opening or predetermined valve position. Consequently, the operation of the vehicle air-conditioning device 1 can be stopped at an early time.

(12-3) Noise Improvement Control when Stopping Operation of Vehicle Air-Conditioning Device 1 from MAX Cooling Mode (Part 3)

Figure 7:
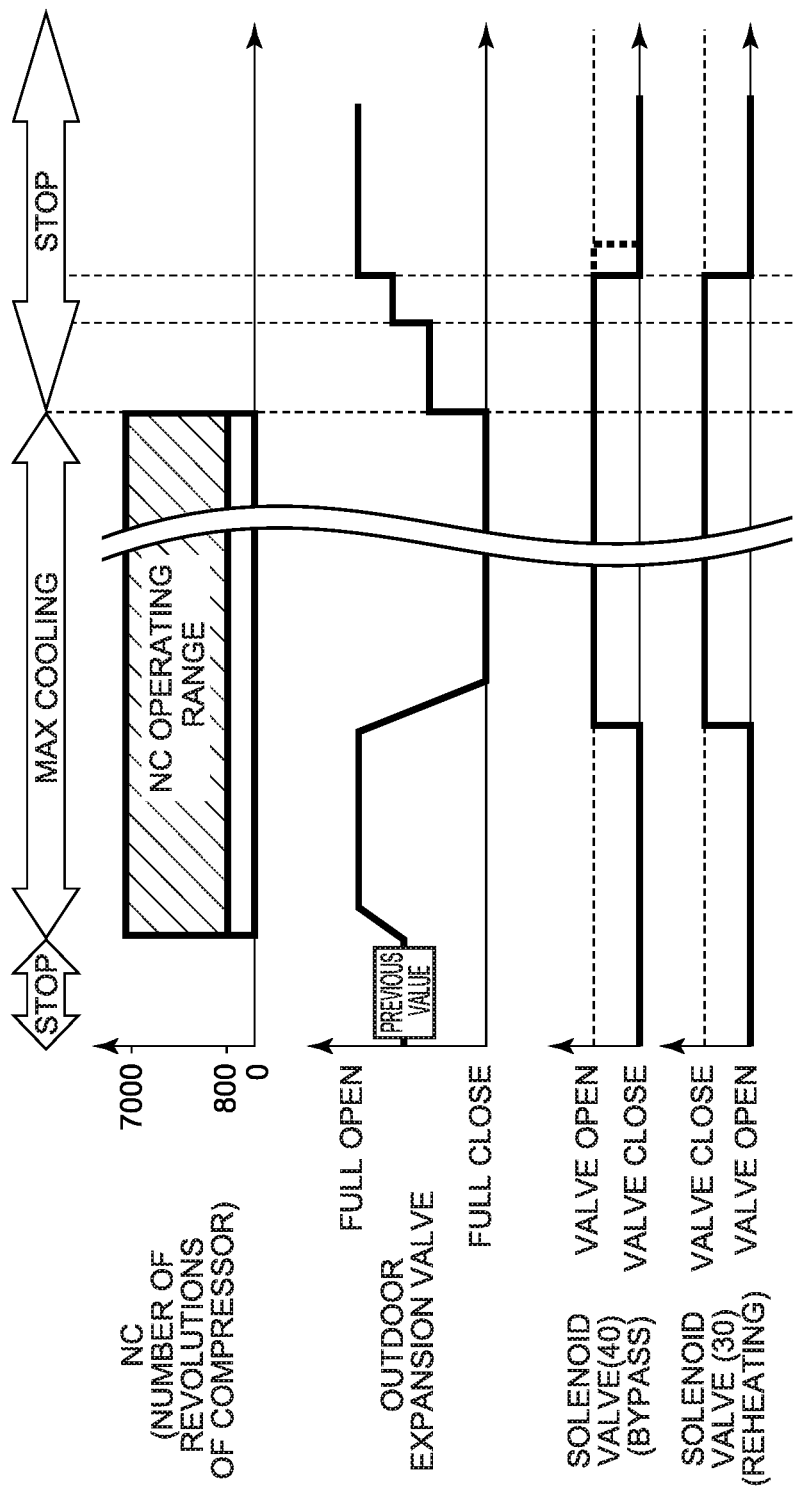
FIG. 7 is a timing chart to describe noise improvement control when stopping an operation from a MAX cooling mode by the heat pump controller of FIG. 2.

Further, although the solenoid valve 40 is closed simultaneously when the solenoid valve 30 is opened in the above respective embodiments, the solenoid valve 40 may be closed as being non-energized (the power of the control device 11 being turned OFF) after the solenoid valve 30 is opened as being non-energized as indicated by a broken line in FIG. 7. Thereby, it is possible to reliably prevent the region surrounded by the discharge side of the compressor 2 and the respective solenoid valves 30 and 40 from becoming the closed state.

Further, as in the respective embodiments, the present invention is effective where the solenoid valve 30 is used as the normally opened solenoid valve closed in the energization state and opened in the non-energization state, and the solenoid valve 40 is used as the normally closed solenoid valve opened in the energization state and closed in the non-energization state. When stopping the operation of the vehicle air-conditioning device from its operating state in the MAX cooling mode, the control device 11 is supplied with the power even after the compressor 2 is stopped, to maintain the solenoid valve 30 and the solenoid valve 40 in the energized state, and is shut off from the power supply after the valve position of the outdoor expansion valve 6 is fully opened, or after the valve position is enlarged to the predetermined valve position, or after the pressure difference ΔPdc in before and after the solenoid valve 30 is reduced to the predetermined value, to make the solenoid valve 30 non-energized and make the solenoid valve 40 non-energized as well. Consequently, it is possible to stop the supply of the power to the control device 11 and also the energization to the solenoid valve 30 and the solenoid valve 40 at an early time while appropriately eliminating or reducing the noise.

Embodiment 2

Figure 8:
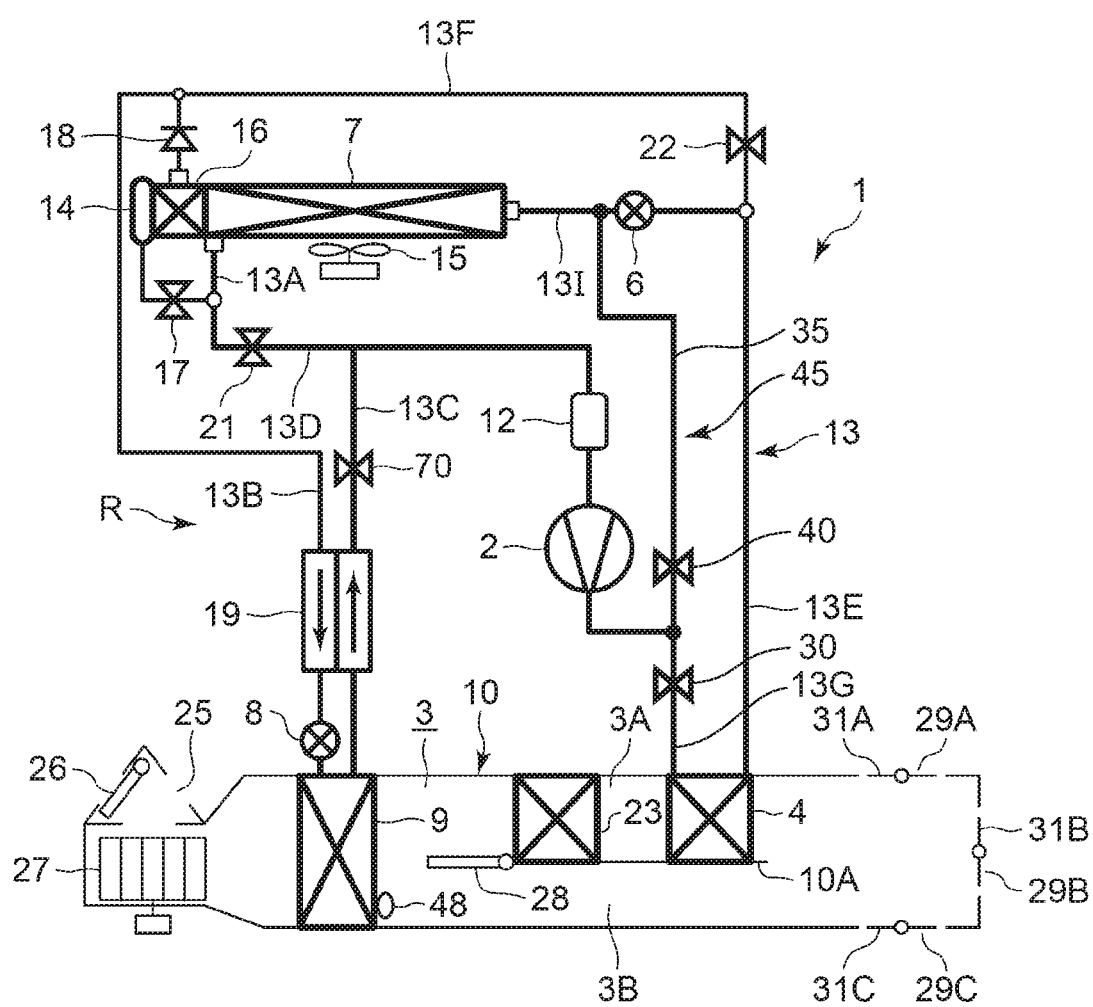
FIG. 8 is a constitutional view of a vehicle air-conditioning device of another embodiment to which the present invention is applied (Embodiment 2)

Next, FIG. 8 shows a constitutional view of a vehicle air-conditioning device 1 of another embodiment to which the present invention is applied. Incidentally, in this drawing, components denoted at the same reference numerals as those in FIG. 1 have the same or similar function. In the case of the present embodiment, an outlet of a subcooling portion 16 is connected to a check valve 18. An outlet of the check valve 18 is connected to a refrigerant pipe 13B. Incidentally, the check valve 18 has a refrigerant pipe 13B (an indoor expansion valve 8) side which serves as a forward direction.

Further, a refrigerant pipe 13E on an outlet side of a radiator 4 branches before an outdoor expansion valve 6, and this branching refrigerant pipe 13F communicates and connects with a refrigerant pipe 13B on a downstream side of the check valve 18 via a solenoid valve 22 (for dehumidification). Additionally, an evaporation pressure control valve 70 is connected to a refrigerant pipe 13C on an outlet side of a heat absorber 9 on a refrigerant downstream side of an internal heat exchanger 19 and on a refrigerant upstream side than a joining point with a refrigerant pipe 13D. Then, these solenoid valve 22 and evaporation pressure control valve 70 are also connected to an output of a heat pump controller 32. Since others are similar to those in FIG. 1, their description will be omitted.

With the above constitution, an operation of the vehicle air-conditioning device 1 of this embodiment will be described. In this embodiment, the heat pump controller 32 changes and executes respective operation modes of a heating mode, a dehumidifying and heating mode, an internal cycle mode, a dehumidifying and cooling mode, a cooling mode, a MAX cooling mode (maximum cooling mode), and an auxiliary heater single mode. Incidentally, since operations and a flow of a refrigerant when the heating mode, the dehumidifying and cooling mode, and the cooling mode are selected, and the auxiliary heater single mode are similar to those in the above-described embodiment (Embodiment 1), their description will be omitted. However, in the present embodiment (Embodiment 2), the solenoid valve 22 is assumed to be closed in these heating mode, dehumidifying and cooling mode, cooling mode and MAX cooling mode.

(13) Dehumidifying and Heating Mode of Vehicle Air-Conditioning Device 1 in FIG. 8

On the other hand, when the dehumidifying and heating mode is selected, the heat pump controller 32 opens a solenoid valve 21 (for the heating), closes a solenoid valve 17 (for the cooling), opens a solenoid valve 30 (for the reheating), and closes a solenoid valve 40 (for the bypass) in this embodiment. Also, the heat pump controller 32 opens the solenoid valve 22 (for the dehumidification). Then, the heat pump controller 32 operates a compressor 2. An air conditioning controller 20 operates respective blowers 15 and 27, and an air mix damper 28 basically has a state of passing all the air in an air flow passage 3, which is blown out from the indoor blower 27 and then flows via a heat absorber 9, through an auxiliary heater 23 and a radiator 4 in a heating heat exchange passage 3A, but performs an air volume adjustment as well.

Consequently, a high-temperature high-pressure gas refrigerant discharged from the compressor 2 flows from a refrigerant pipe 13G into the radiator 4. Since the air in the air flow passage 3 flowing into the heating heat exchange passage 3A passes through the radiator 4, the air in the air flow passage 3 is heated by the high-temperature refrigerant in the radiator 4, whereas the refrigerant in the radiator 4 has the heat taken by the air and is cooled to condense and liquefy.

The refrigerant liquefied in the radiator 4 flows out from the radiator 4 and then reaches the outdoor expansion valve 6 through the refrigerant pipe 13E. The refrigerant flowing into the outdoor expansion valve 6 is decompressed therein, and then flows into an outdoor heat exchanger 7. The refrigerant flowing into the outdoor heat exchanger 7 evaporates, and the heat is pumped up from the outdoor air passed by running or the outdoor blower 15. In other words, a refrigerant circuit R functions as a heat pump. Then, a circulation is repeated in which the low-temperature refrigerant flowing out from the outdoor heat exchanger 7 flows via a refrigerant pipe 13A, the solenoid valve 21, and the refrigerant pipe 13D from the refrigerant pipe 13C into an accumulator 12, where it is subjected to gas-liquid separation, and then the gas refrigerant is sucked into the compressor 2.

Further, a part of the condensed refrigerant flowing to the refrigerant pipe 13E through the radiator 4 is distributed and flows through the solenoid valve 22 to reach from the second bypass pipe 13F and the refrigerant pipe 13B to the indoor expansion valve 8 through the internal heat exchanger 19. The refrigerant is decompressed by the indoor expansion valve 8 and then flows into the heat absorber 9 to evaporate. The water in the air blown out from the indoor blower 27 coagulates to adhere to the heat absorber 9 by a heat absorbing operation at this time, and hence, the air is cooled and dehumidified.

A circulation is repeated in which the refrigerant evaporated in the heat absorber 9 joins the refrigerant from the refrigerant pipe 13D at the refrigerant pipe 13C through the internal heat exchanger 19 and the evaporation pressure control valve 70 successively, and is then sucked into the compressor 2 through the accumulator 12. The air dehumidified in the heat absorber 9 is reheated in the process of passing through the radiator 4, and hence the dehumidifying and heating of a vehicle interior are performed.

The air conditioning controller 20 transmits a target heater temperature TCO (a target value of a radiator outlet temperature TCI) calculated from a target outlet temperature TAO to the heat pump controller 32. The heat pump controller 32 calculates a target radiator pressure PCO (a target value of a radiator pressure PCI) from the target heater temperature TCO, and controls the number of revolutions NC of the compressor 2 on the basis of the target radiator pressure PCO and the refrigerant pressure (a radiator pressure PCI, which is a high pressure of the refrigerant circuit R) of the radiator 4 which is detected by a radiator pressure sensor 47 to control heating by the radiator 4. Further, the heat pump controller 32 controls a valve position of the outdoor expansion valve 6 on the basis of a temperature Te of the heat absorber 9 detected by a heat absorber temperature sensor 48, and a target heat absorber temperature TEO transmitted from the air conditioning controller 20. Further, the heat pump controller 32 opens (to enlarge a flow path)/closes (to allow small refrigerant to flow) the evaporation pressure control valve 70 on the basis of the temperature Te of the heat absorber 9 detected by the heat absorber temperature sensor 48 to prevent inconvenience that the heat absorber 9 is frozen due to an excessive drop of its temperature.

(14) Internal Cycle Mode of Vehicle Air-Conditioning Device 1 of FIG. 8

Further, in the internal cycle mode, the heat pump controller 32 fully closes the outdoor expansion valve 6 in a state of the above dehumidifying and heating mode (fully closed position) and closes the solenoid valve 21. With the closure of the outdoor expansion valve 6 and the solenoid valve 21, the inflow of the refrigerant into the outdoor heat exchanger 7, and the outflow of the refrigerant from the outdoor heat exchanger 7 are prevented, and hence the condensed refrigerant flowing into the refrigerant pipe 13E through the radiator 4 all flows into the second bypass pipe 13F through the solenoid valve 22. Then, the refrigerant flowing through the second bypass pipe 13F reaches from the refrigerant pipe 13B to the indoor expansion valve 8 through the internal heat exchanger 19. The refrigerant is decompressed by the indoor expansion valve 8 and then flows into the heat absorber 9 to evaporate. The water in the air blown out from the indoor blower 27 coagulates to adhere to the heat absorber 9 by a heat absorbing operation at this time, and hence, the air is cooled and dehumidified.

A circulation is repeated in which the refrigerant evaporated in the heat absorber 9 flows into the refrigerant pipe 13C through the internal heat exchanger 19 and the evaporation pressure control valve 70 successively, and is sucked into the compressor 2 through the accumulator 12. The air dehumidified in the heat absorber 9 is reheated in the process of passing through the radiator 4, and hence the dehumidifying and heating of the vehicle interior are performed. Since, however, the refrigerant is circulated between the radiator 4 (heat radiation) and the heat absorber 9 (heat absorption) lying in the air flow passage 3 on the indoor side in the internal cycle mode, the pumping up of heat from the outdoor air is not performed, and a heating capability corresponding to power consumption of the compressor 2 is exhibited. Since the whole amount of the refrigerant flows through the heat absorber 9 which exhibits a dehumidifying operation, a dehumidifying capability is high as compared with the above dehumidifying and heating mode, but the heating capability becomes low.

The air conditioning controller 20 transmits the target heater temperature TCO (the target value of the radiator outlet temperature TCI) calculated from the target outlet temperature TAO to the heat pump controller 32. The heat pump controller 32 calculates a target radiator pressure PCO (a target value of a radiator pressure PCI) from the transmitted target heater temperature TCO, and controls the number of revolutions NC of the compressor 2 on the basis of the target radiator pressure PCO and the refrigerant pressure (the radiator pressure PCI, which is the high pressure of the refrigerant circuit R) of the radiator 4 which is detected by the radiator pressure sensor 47 to control heating by the radiator 4.

Further, even in the case of the present embodiment, the noise improvement control at the time that the vehicle air-conditioning device 1 is stopped from the MAX cooling mode of the aforementioned (12) is performed, thereby making it possible to eliminate or suppress vibration and noise generated in the solenoid valve 40 and the solenoid valve 30.

Incidentally, although each embodiment has described the case where the operation is stopped from the MAX cooling mode, noise improvement control similar to the above is executed even in stopping the operation of the vehicle air-conditioning device 1 from the dehumidifying and heating mode in the refrigerant circuit R of Embodiment 1. Consequently, vibration and noise generated in the solenoid valve 40 and the solenoid valve 30 when stopping the operation from the dehumidifying and heating mode can also be eliminated or reduced in like manner.

Also, the control of changing the respective operation modes, which is shown in the embodiment is not limited thereto. Any of the parameters such as the outdoor air temperature Tam, the humidity of the vehicle interior, the target outlet temperature TAO, the radiator temperature TH, the target radiator temperature TCO, the heat absorber temperature Te, the target heat absorber temperature TEO, the presence or absence of the dehumidifying request for the vehicle interior, etc., or their combinations or all of them may be adopted according to the capability of the vehicle air-conditioning device and its use environment to set suitable conditions.

Further, the auxiliary heating device is not limited to the auxiliary heater 23 shown in the embodiment, but a heating medium circulating circuit of circulating a heating medium heated by a heater to heat air in an air flow passage, a heater core of circulating radiator water heated by an engine, etc. may be utilized. In addition, the constitution of the refrigerant circuit R described in each embodiment described above is not limited thereto, but may needless to say be changed within the scope not departing from the spirit of the present invention.

DESCRIPTION OF REFERENCE NUMERALS 1 vehicle air-conditioning device
2 compressor
3 air flow passage
4 radiator
6 outdoor expansion valve
7 outdoor heat exchanger
8 indoor expansion valve
9 heat absorber
10 HVAC unit
11 control device
20 air conditioning controller
23 auxiliary heater (auxiliary heating device)
27 indoor blower (blower fan)
28 air mix damper
30 solenoid valve (first opening/closing valve)
32 heat pump controller
35 bypass pipe
40 solenoid valve (opening/closing valve, second opening/closing valve)
42 discharge pressure sensor
47 radiator pressure sensor
65 vehicle communication bus
R refrigerant circuit.

The invention claimed is:
1. A vehicle air-conditioning device comprising:
a compressor to compress a refrigerant;
an air flow passage through which air to be supplied to a vehicle interior flows;
a radiator to let the refrigerant radiate heat, thereby heating the air to be supplied from the air flow passage to the vehicle interior;
a heat absorber to let the refrigerant absorb heat, thereby cooling the air to be supplied from the air flow passage to the vehicle interior;
an outdoor heat exchanger provided outside the vehicle interior;
an outdoor expansion valve to decompress the refrigerant flowing out from the radiator and flowing into the outdoor heat exchanger;
a first opening/closing valve provided between a discharge side of the compressor and an inlet side of the radiator;
a bypass pipe to branch on an upstream side of the first opening/closing valve to bypass the radiator and the outdoor expansion valve, thereby letting the refrigerant discharged from the compressor flow into the outdoor heat exchanger;
a second opening/closing valve provided in the bypass pipe; and
a control device,
wherein the control device executes at least an operation mode to fully close the outdoor expansion valve, close the first opening/closing valve, and open the second opening/closing valve to thereby let the refrigerant discharged from the compressor flow into the outdoor heat exchanger by the bypass pipe and radiate heat, decompress the refrigerant from which the heat has been radiated, and then let the refrigerant absorb heat in the heat absorber,
wherein during stopping of operation, the first opening/closing valve is opened and the second opening/closing valve is closed, and
wherein when the operation is stopped from a state in which the compressor is operating in the operation mode, the control device maintains the first opening/closing valve in a closed state and the second opening/closing valve in an opened state even after the compressor is stopped.

2. The vehicle air-conditioning device according to claim 1, wherein when the operation is stopped from the state in which the compressor is operating in the operation mode, the control device stops the compressor and opens the outdoor expansion valve.

3. The vehicle air-conditioning device according to claim 2, wherein when a valve position of the outdoor expansion valve is enlarged to a predetermined valve position, the control device opens the first opening/closing valve and closes the second opening/closing valve.

4. The vehicle air-conditioning device according to claim 3, wherein the control device closes the second opening/closing valve after the first opening/closing valve is opened.

5. The vehicle air-conditioning device according to claim 4, wherein the first opening/closing valve is a solenoid valve closed in an energization state and opened in a non-energization state, and the second opening/closing valve is a solenoid valve opened in an energization state and closed in a non-energization state, and
wherein when the operation is stopped from the state in which the compressor is operating in the operation mode, the control device is supplied with power even after the compressor is stopped, to maintain the first opening/closing valve and the second opening/closing valve in an energized state, and is shut off from the power supply after the valve position of the outdoor expansion valve is enlarged to the predetermined valve position or fully opened, or the pressure difference in before and after the first opening/closing valve is reduced to the predetermined value, to make the first opening/closing valve non-energized and also make the second opening/closing valve non-energized.

6. The vehicle air-conditioning device according to claim 3, wherein when the outdoor expansion valve is fully opened, the control device opens the first opening/closing valve and closes the second opening/closing valve.

7. The vehicle air-conditioning device according to claim 3, wherein the first opening/closing valve is a solenoid valve closed in an energization state and opened in a non-energization state, and the second opening/closing valve is a solenoid valve opened in an energization state and closed in a non-energization state, and
wherein when the operation is stopped from the state in which the compressor is operating in the operation mode, the control device is supplied with power even after the compressor is stopped, to maintain the first opening/closing valve and the second opening/closing valve in an energized state, and is shut off from the power supply after the valve position of the outdoor expansion valve is enlarged to the predetermined valve position or fully opened, or the pressure difference in before and after the first opening/closing valve is reduced to the predetermined value, to make the first opening/closing valve non-energized and also make the second opening/closing valve non-energized.

8. The vehicle air-conditioning device according to claim 2, wherein when the outdoor expansion valve is fully opened, the control device opens the first opening/closing valve and closes the second opening/closing valve.

9. The vehicle air-conditioning device according to claim 8, wherein when a pressure difference in before and after the first opening/closing valve is reduced to a predetermined value after the compressor is stopped, the control device opens the first opening/closing valve and closes the second opening/closing valve.

10. The vehicle air-conditioning device according to claim 1, wherein when a pressure difference in before and after the first opening/closing valve is reduced to a predetermined value after the compressor is stopped, the control device opens the first opening/closing valve and closes the second opening/closing valve.

11. The vehicle air-conditioning device according to claim 10, wherein the control device closes the second opening/closing valve after the first opening/closing valve is opened.

12. The vehicle air-conditioning device according to claim 1, wherein the first opening/closing valve is a solenoid valve closed in an energization state and opened in a non-energization state, and the second opening/closing valve is a solenoid valve opened in an energization state and closed in a non-energization state, and
    wherein when the operation is stopped from the state in which the compressor is operating in the operation mode, the control device is supplied with power even after the compressor is stopped, to maintain the first opening/closing valve and the second opening/closing valve in an energized state, and is shut off from the power supply after the valve position of the outdoor expansion valve is enlarged to the predetermined valve position or fully opened, or the pressure difference in before and after the first opening/closing valve is reduced to the predetermined value, to make the first opening/closing valve non-energized and also make the second opening/closing valve non-energized.

13. The vehicle air-conditioning device according to claim 12, wherein the operation mode is a maximum cooling mode to fully close the outdoor expansion valve, close the first opening/closing valve, and open the second opening/closing valve to let the refrigerant discharged from the compressor flow into the outdoor heat exchanger by the bypass pipe and radiate heat, decompress the refrigerant from which the heat has been radiated, and then let the refrigerant absorb heat in the heat absorber.

14. The vehicle air-conditioning device according to claim 1, wherein the operation mode is a maximum cooling mode to fully close the outdoor expansion valve, close the first opening/closing valve, and open the second opening/closing valve to let the refrigerant discharged from the compressor flow into the outdoor heat exchanger by the bypass pipe and radiate heat, decompress the refrigerant from which the heat has been radiated, and then let the refrigerant absorb heat in the heat absorber.

15. The vehicle air-conditioning device according to claim 14, including an auxiliary heating device provided in the air flow passage,
    wherein the operation mode is a dehumidifying and heating mode to fully close the outdoor expansion valve, close the first opening/closing valve, and open the second opening/closing valve to let the refrigerant discharged from the compressor flow into the outdoor heat exchanger by the bypass pipe and radiate heat, decompress the refrigerant from which the heat has been radiated, and then let the refrigerant absorb heat in the heat absorber and let the auxiliary heating device generate heat.

16. The vehicle air-conditioning device according to claim 1, including an auxiliary heating device provided in the air flow passage,
    wherein the operation mode is a dehumidifying and heating mode to fully close the outdoor expansion valve, close the first opening/closing valve, and open the second opening/closing valve to let the refrigerant discharged from the compressor flow into the outdoor heat exchanger by the bypass pipe and radiate heat, decompress the refrigerant from which the heat has been radiated, and then let the refrigerant absorb heat in the heat absorber and let the auxiliary heating device generate heat.

17. The vehicle air-conditioning device according to claim 16, wherein the opening/closing valve is a pilot type solenoid valve to operate a valve body by using a difference in pressure between the refrigerant inflow side and the refrigerant outflow side.

18. The vehicle air-conditioning device according to claim 1, wherein the opening/closing valve is a pilot type solenoid valve to operate a valve body by using a difference in pressure between the refrigerant inflow side and the refrigerant outflow side.

* * * * *